United States Patent
Arai

[19]

[11] Patent Number: 6,081,404

[45] Date of Patent: Jun. 27, 2000

[54] CASSETTE TAPE DRIVING DEVICE WITH AUTO-REVERSE FUNCTION

[75] Inventor: Susumu Arai, Urawa, Japan

[73] Assignee: Asahi Corporation, Tokyo, Japan

[21] Appl. No.: 09/046,380

[22] Filed: Mar. 23, 1998

[30] Foreign Application Priority Data

Mar. 31, 1997 [JP] Japan .................................. 9-096781

[51] Int. Cl.[7] .............................. G11B 5/008; G11B 5/54; G11B 5/55

[52] U.S. Cl. .......................... 360/96.3; 360/105; 360/106

[58] Field of Search .................................. 360/96.3, 96.4, 360/105, 106, 137

[56] References Cited

U.S. PATENT DOCUMENTS

| | | | |
|---|---|---|---|
| 4,757,405 | 7/1988 | Laudus | 360/105 |
| 4,922,357 | 5/1990 | Komatsu | 360/105 |

FOREIGN PATENT DOCUMENTS 7-9214  3/1995  Japan .

*Primary Examiner*—A. J. Heinz
*Attorney, Agent, or Firm*—H. C. Chan

[57] ABSTRACT

When an auto-reverse is designated in the state of the magnetic tape of a cassette being transferred in a first direction with a planetary gear meshing with a first reel gear, a motor reverses, and also a central gear reverses such that the planetary gear starts revolving around the central gear away from the first reel gear. The planetary gear meshes with a mode changing gear, and rotate the mode changing gear, a projection and a switching member. In accordance with the rotation of the switching member, a head base moves horizontally and a magnetic head separates from the magnetic tape. Further, a bent piece on the head base abuts against a stopper, due to which the revolution of the planetary gear stops, and the planetary gear stays to assuredly transmit the revolution of the central gear to the mode changing gear. Moreover, the projection while in rotation presses a slider. As the slider slides, the magnetic head turns 180°. When the mode changing gear further rotates, the head base horizontally moves again in accordance with the rotation of the switching member, and the magnetic head comes into contact with the magnetic head. The bent piece also moves horizontally, as a result of which the bent piece and the stopper disengage from each other, and the planetary gear becomes revolvable and starts revolving around the central gear toward a second reel gear. The planetary gear meshes with the second reel gear, and drives the second reel gear to transfer the magnetic tape in the reverse direction. Thus, using the driving force generated by the motor, the reversal of the transfer direction of the magnetic tape, the rotation of the magnetic head and the movement of the head base are performed.

19 Claims, 12 Drawing Sheets

CASSETTE TAPE DRIVING DEVICE WITH AUTO-REVERSE FUNCTION

BACKGROUND OF THE INVENTION

1. Field of the Invention

The present invention relates to a cassette tape driving device which can drive capstans, reel bases and a head base by using a single motor.

The present invention relates also to a cassette tape driving device which can assuredly change operation modes from one to another.

2. Description of the Related Art

A cassette tape driving device rotates a capstan and reel rotary shafts, brings a magnetic head into contact with, or separates the magnetic head from, a magnetic tape, and drives a head base in order to bring a pinch roller into contact with, or to separate the pinch roller from, the capstan. A conventional cassette tape driving device drives the capstan and the reel rotary shafts by means of a single motor, and drives the head base through the use of a single solenoid. In this structure, however, the motor and the solenoid are required, the number of parts is large, and the mechanism is complicated, entailing the problem that the cost of manufacturing the device is high.

In order to solve such a problem, Examined Japanese Utility Model Application No. 7-9214 discloses a cassette tape driving device which drives the capstan, the reel bases and the head base by means of a single motor.

The cassette tape driving device disclosed by Examined Japanese Utility Model Application No. 7-9214 has the structure illustrated in FIG. 17. Using a motor 50, the above-mentioned cassette tape driving device drives a capstan 70, reel gears 160 and 170 coupled to the rotary shafts (reel bases) for rotating a tape-up reel and a supply reel, and a head base 210 to which a magnetic head 100 is fixed.

The basic operation of the above cassette tape driving device will now be described with reference to FIG. 17.

In the case of playing back the information recorded on a cassette tape or recording information on the cassette tape, the motor 50 is rotated in the direction of an arrow YC. This rotation is transmitted to a pulley 120 through a belt 60. A central gear 130 is fixed to the center of the pulley 120, and one end of an arm 140 is rotatably attached to the central gear 130. A planetary gear 150 revolves around the central gear 130 in the state of being in mesh with the central gear 130. A mode changing gear 180 is provided in the orbit along which the planetary gear 150 revolves.

When the central gear 130 rotates in the direction of the arrow YC, the planetary gear 150 revolves around the central gear 130 in the direction of the arrow YC in accordance with the rotation of the central gear 130. The planetary gear 150 revolves until its teeth 155 engage with the teeth 185 of the mode changing gear 180. When the teeth 155 engage with the teeth 185, the planetary gear 150 halts and transmits the rotation of the central gear 130 to the mode changing gear 180.

The mode changing gear 180 is provided with switching cams 190 and 200. The switching cams 190 and 200 rotate in accordance with the rotation of the mode changing gear 180. The head base 210 has a bent piece 215, and is urged by a spring 220 in the direction of an arrow YB. While rotating, the switching cams 190 and 200 press the bent piece 215. The head base 210, the bent piece 215 of which is being pressed by the switching cams 190 and 200, moves in the direction of an arrow YA against the urging force exerted by the spring 220. The magnetic head 100 provided on the head base 210 also moves in accordance with the movement of the head base 210, and comes into contact with the magnetic tape of the cassette arranged on reel bases 160 and 170. Further, the planetary gear 150 and that circumferential part of the mode changing gear 180 which does not have the teeth 185 become face to face with each other, the mode changing gear 180 and the planetary gear 150 disengage from each other, and the mode changing gear 180 halts. Accordingly, the magnetic head 100 and the magnetic tape keep contacting each other.

In the case of stopping the cassette tape driving device, the motor 50 is rotated in the direction opposite to that of the arrow YC. Upon this reverse rotation, the planetary gear 150 revolves in the direction opposite to that of the arrow YC, comes into mesh with the mode changing gear 180, and rotates the mode changing gear 180 in the direction opposite to that of the arrow YC such that the bent piece 215 and the cam 190 or 200 disengage from each other. Due to the urging force, the head base 210 returns to its original position, and the magnetic head 100 separates from the magnetic tape.

The planetary gear 150 needs to assuredly transmit the rotation of the central gear 130 to the mode changing gear 180 with the planetary gear 150 being in mesh with the central gear 130 and the mode changing gear 180. However, there is the case where the engagement between the teeth 155 of the planetary gear 150 and the teeth 185 of the mode changing gear 180 is not satisfactory because of a manufacturing error or the like. In such a case, the planetary gear 150 does not stop revolving and cannot transmit the driving force of the central gear 130 to the mode changing gear 180. Also in the case where the load on the planetary gear 150 is heavy, the planetary gear 150 cannot stop revolving and cannot transmit the driving force of the central gear 130 to the mode changing gear 180.

Some cassette tape driving devices are an auto-reverse type. The auto-reverse type cassette tape driving device disclosed in Examined Japanese Utility Model Application 7-9214 has two magnetic heads, and uses one of them in accordance with the direction in which the magnetic tape travels. However, the mechanism of this cassette tape driving device is complicated owing to the presence of the two magnetic heads, and the cost of manufacturing the device is high.

Some auto-reverse type cassette tape driving devices have a structure for turning one magnetic head in accordance with the tape traveling direction. However, this type of cassette tape driving device requires a solenoid for turning the magnetic head by 180°, the number of parts is large, and the mechanism is complicated, which entails the problem that the cost of manufacturing the device is high.

The present invention has been made in consideration of the above circumstances, and it is an object of the present invention to provide an auto-reverse type cassette tape driving device which can perform the basic operation with a single motor.

It is another object of the present invention to provide a cassette tape driving device which can assuredly transmit the rotation of the central gear to the mode changing gear.

SUMMARY OF THE INVENTION

According to the first aspect of the present invention which aims to achieve the above-described objects, there is provided a cassette tape driving device comprising:

a motor, a head base including a magnetic head and first and second members, and being movable between a first position in which the magnetic head is separate from a magnetic tape of a cassette and a second position in which the magnetic head is in contact with the magnetic tape;

a central gear which rotates in accordance with a rotation of said motor;

a planetary gear which rotates in mesh with the central gear and which revolves along an orbit around the central gear while the planetary gear is rotating in mesh with the central gear;

a pair of reel gears which are arranged in the vicinity of the orbit of the planetary gear and which rotate a pair of reel bases for rotating reels of the cassette, the planetary gear revolving in a direction in which the central gear rotates and coming into mesh with one of the pair of reel gears, and the planetary gear rotating the reel gear which has meshed with the planetary gear, thereby rotating one of the pair of reel bases in order to have one of the reels take up the magnetic tape;

a third member which is attached to the planetary gear and which revolves around the central gear together with the planetary gear, the third member abutting against the second member while the third member is revolving around the central gear, thereby stopping the planetary gear from revolving;

a mode changing gear arranged in a position in which the mode changing gear meshes with the planetary gear which has stopped revolving upon the abutting of the third member against the second member, the mode changing gear having a toothed portion and an untoothed portion both being formed to allow the mode changing gear to rotate through a predetermined angle in accordance with the rotation of the planetary gear; and a switching member which rotates together with the mode changing gear and which presses the first member, thereby moving the head base to the second position in order to bring the magnetic head into contact with the magnetic tape, and the switching member releasing the second and third members from the state of abutting against each other, thereby permitting the planetary gear to revolve around the central gear.

It is preferred that the head base be urged toward the first position from the second position, and that when the first member is released from a pressure which the switching member applies to the first member, the head base return to the first position toward which the head base is urged, and make the second member abut against the third member.

According to the above-described cassette tape driving device, upon rotating the motor in a first direction, for example, the central gear rotates in the first direction, and the planetary gear revolves around the central gear in the first direction. When the planetary gear reaches a predetermined position, the second and third members abut against each other and stop the revolution of the planetary gear. Under those conditions, the mode changing gear reliably rotates even in the case where the engagement between the planetary gear and the mode changing gear is unsatisfactory. As the mode changing gear rotates, the switching member presses the head base so as to bring the magnetic head into contact with the tape. Furthermore, as a result of the head base being moved, the second and third members are released from the state of abutting against each other, and the planetary gear becomes revolvable again. The planetary gear keeps revolving in accordance with the rotation of the central gear, and meshes with one reel gear and rotates that reel gear to make the tape travel.

When the motor rotates in a second direction under that condition, the central gear rotates in the second direction. The planetary gear while revolving around the central gear comes into mesh with the mode changing gear, and rotates the mode changing gear in the second direction, as a result of which the switching member also rotates such that the head base is released from the pressure applied by the switching member. Since the head base is urged in the opposite direction to that of the pressure applied by the switching member, the head base is released from the pressure, and the magnetic head separates from the magnetic tape.

Moreover, in accordance with the movement of the head base, the second member moves to a position in which the second member abuts against the third member, and the second and third members become the state of abutting against each other. Under this condition, even in the case where the engagement between the planetary gear and the mode changing gear is unsatisfactory, the planetary gear reliably stops revolving and rotates the mode changing gear such that the switching member presses the head base again and moves it to the second position. Accordingly, the magnetic head comes into contact with the magnetic head, the second and third members are released from the state of abutting against each other, and the planetary gear revolves again until the planetary gear meshes with the other reel gear. The planetary gear rotates that reel gear to make the tape travel, in other words, to transfer the magnetic tape in the reverse direction.

It is preferred that the mode changing gear include a fourth member which rotates together with the mode changing gear and which abuts against the first member to stop the rotation of the mode changing gear when the mode changing gear has rotated through the predetermined angle.

According to this cassette tape driving device, the fourth member abuts against the first member when the switching member presses the head base while the switching member is rotating in accordance with the rotation of the mode changing gear. This ensures a constant rotational angle to the mode changing gear and the switching member, and allows the positions between which the head base is moved to be constant.

It is preferred that the above-described cassette tape driving device further comprise:

a pinch roller formed on the head base; and a capstan which rotates in accordance with the rotation of the motor and transfers the magnetic tape in cooperation with the pinch roller with the magnetic tape being held between the capstan and the pinch roller when the head base is located in the second position.

According to this cassette tape driving device, the switching member moves the pinch roller together with the magnetic head when the switching member presses and moves the head base.

The magnetic head and the pinch roller are moved together also when the head base is released from the pressure applied by the switching member. Thus, the rotation of the reel bases, the movement of the magnetic head, the movement of the pinch roller and the rotation of the capstan can be achieved using the single motor.

According to the second aspect of the present invention which aims to achieve the above-described objects, there is provided an auto-reverse type cassette tape driving device comprising:

a head base including a first member and a head holder holding a magnetic head, the head base being movable between a first position in which the magnetic head is separate from a magnetic tape of a cassette and a second position in which the magnetic head is in contact with the magnetic tape;

a central gear which rotates in accordance with a rotation of a motor;

a planetary gear which rotates in mesh with the central gear and which revolves along an orbit around the central gear while the planetary gear is rotating in mesh with the central gear;

a pair of reel gears which are arranged in the vicinity of the orbit of the planetary gear and which rotate a pair of reel bases for rotating reels of the cassette, the planetary gear revolving in a direction in which the central gear rotates and coming into mesh with one of the pair of reel gears, and the planetary gear rotating the reel gear which has meshed with the planetary gear, thereby rotating one of the pair of reel bases in order to have one of the reels take up the magnetic tape;

a mode changing gear arranged in a position in which the mode changing gear meshes with the planetary gear while the planetary gear is revolving along the orbit, the mode changing gear having a toothed portion and an untoothed portion both being formed to allow the mode changing gear to rotate through a predetermined angle in accordance with the rotation of the planetary gear;

a switching member which rotates together with the mode changing gear and which presses the head base, thereby moving the head base to the second position in order to bring the magnetic head into contact with the magnetic tape;

a second member which rotates together with the mode changing gear; and a slide lever which engages with the second member and moves horizontally to turn the head holder by a predetermined angle, while the second member is rotating.

It is preferred that the head base be urged toward the first position from the second position, and that when the first member is released from a pressure which the switching member applies to the first member, the head base return to the first position to which the head base is urged.

According to the auto-reverse type cassette tape driving device described above, upon rotating the motor in the first direction, for example, the central gear rotates in the first direction, and the planetary gear rotates in the first direction. When the planetary gear reaches a predetermined position, the planetary gear transmits the rotation of the central gear to the mode changing gear. In accordance with the rotation of the mode changing gear, the switching member presses the head base so as to bring the magnetic head into contact with the magnetic tape. Further, the untoothed portion of the mode changing gear becomes face to face with the planetary gear, and the mode changing gear and the planetary gear disengage from each other. The second member rotates together with the mode changing gear, engages with the slide lever, and moves the slide lever horizontally. The head holder rotates in accordance with the horizontal movement of the slide lever, and the magnetic head is directed in accordance with the traveling direction of the magnetic tape. The planetary gear becomes revolvable again, and keeps revolving around the central gear while rotating in mesh with the central gear. The planetary gear comes into mesh with one reel gear and rotates that reel gear to have the magnetic tape travel.

When the motor rotates in a second direction under that condition, the central gear rotates in the second direction. The planetary gear while revolving around the central gear comes into mesh with the mode changing gear, and rotates the mode changing gear in the second direction, as a result of which also the switching member rotates such that the head base is released from the pressure applied by the switching member, and the magnetic head separates from the magnetic tape. The second member rotates together with the mode changing gear, engages with the slide lever, and moves the slide lever horizontally. The head holder rotates in accordance with the horizontal movement of the slide lever, and the magnetic head is directed in accordance with the traveling direction of the magnetic tape. When the planetary gear further rotates the mode changing gear, the switching member presses the head base again and moves it to the second position. The magnetic head comes into contact with the magnetic tape accordingly. When the untoothed portion of the mode changing gear becomes face to face with the planetary gear, the planetary gear and the mode changing gear disengage from each other, and the planetary gear rotates until the planetary gear engages with the other reel gear. The planetary gear rotates that reel gear to have the tape travel, in other words, to transfer the magnetic tape in the reverse direction.

It is preferred that a third member, which revolves around the central gear together with the planetary gear, be attached to the planetary gear, and that the head base further include a fourth member which abuts against the third member when the head base is moved to the first position, and which is released from the state of abutting against the third member when the head base is moved to the second position.

According to this auto-reverse type cassette tape driving device, when the head base is moved to the first position, the fourth member formed on the head base and the third member which revolves around the central gear together with the planetary gear abut against each other, and the planetary gear stops revolving. When the rotation of the planetary gear is transmitted to the mode changing gear, the switching member which rotates together with the mode changing gear presses a fourth member formed on the head base, and moves the head base to the second position. When the head base is moved to the second position, the fourth member and the third member are released from the state of abutting against each other, and the planetary gear becomes revolvable again. Accordingly, the rotation of the planetary gear can be assuredly transmitted to the mode changing gear.

It is preferred that the auto-reverse type cassette tape driving device further comprise:

a pinch roller formed on the head base; and a capstan which rotates in accordance with the rotation of the motor and transfers the magnetic tape in cooperation with the pinch roller with the magnetic tape being held between the capstan and the pinch roller when the magnetic head base is located in the second position.

According to this auto-reverse type cassette tape driving device, the switching member moves the pinch roller together with the magnetic head while the switching member is pressing and moving the head base.

The magnetic head and the pinch roller are moved together also when the head is released from the pressure applied by the switching member. Thus, the rotation of the reel bases, the movement of the magnetic head, the movement of the pinch roller and the rotation of the capstan can be achieved using the single motor.

According to the third aspect of the present invention which aims to achieve the above-described objects, there is provided a cassette tape driving device comprising:

a motor;

instruction means for issuing an instruction designating a transfer direction of a magnetic tape and an instruction designating a reversal of the transfer direction of the magnetic tape;

motor driving means for rotating the motor in a designated direction in response to the instruction designating the transfer direction from the instruction means, and for reversing the motor in response to the instruction designating the reversal of the transfer direction from the instruction means;

head driving means for turning a magnetic head with a rotational force generated by the motor and in accordance with a rotational direction in which the motor is rotated;

moving means for receiving the rotational force generated by the motor and moving the magnetic head with the rotational force to a position in which the magnetic head is to contact the magnetic tape; and reel rotation means for receiving the rotational force from the motor and rotating, with the rotational force, a reel of a cassette containing the magnetic tape in a direction corresponding to the rotational direction of the motor, thereby making the reel take up the magnetic tape;

wherein turning the magnetic head, bringing the magnetic head into contact with the magnetic tape, separating the magnetic head from the magnetic tape and driving the reel are performed using a driving force generated by the motor.

It is preferred that the moving means include means for separating the magnetic head from the magnetic tape once and bringing the magnetic head into contact with the magnetic tape again, in response to the instruction designating the reversal of the transfer direction from the instruction means; and the head driving means turn the magnetic head in accordance with a new transfer direction of the magnetic tape while the magnetic head is separate from the magnetic tape.

According to the auto-reverse type cassette tape driving device described above, in the case of transferring the magnetic tape in the first direction, for example, the instruction means supplies the motor driving means with an instruction to transfer the magnetic tape in the first direction. The motor driving means receives the instruction from the instruction means and rotates the motor in the first direction. The reel rotation means receives the rotation of the motor and rotates a reel of the cassette containing the magnetic tape, thereby making the reel to take up the magnetic tape in order to transfer the tape in the first direction.

Let it be assumed that the instruction means issues the instruction to reverse the transfer direction of the magnetic tape under the above-described conditions. The motor driving means receives the instruction to reverse the transfer direction from the instruction means, and rotates the motor in the second direction opposite to the first direction, as instructed by the instruction means. The moving means receives the rotational force generated by the motor, and separates the magnetic head from the magnetic tape. When the magnetic head is separated from the magnetic tape, the head driving means which has received the rotational force of the motor turns the magnetic head by 180° in accordance with the new transfer direction of the magnetic tape. When the magnetic head is turned, the moving means again brings the magnetic head into contact with the magnetic tape, using the rotational force of the motor. Then, the reel rotation means which has received the rotational force of the motor reverses the reel rotational direction in order to transfer the magnetic tape in the opposite direction to the first direction.

Thus, turning the magnetic head by 180°, moving the magnetic head, and taking up the magnetic tape can be realized using the single motor. Since the magnetic head is turned while the moving means is separating the magnetic head from the magnetic tape, it is prevented that the magnetic head is turned while the magnetic tape and the magnetic head are in contact with each other.

It is preferred that the moving means further include a pinch roller and a capstan both rotating in accordance with the rotational force of the motor and both being provided for transferring the magnetic tape, and that at least one of the pinch roller and the capstan be moved with the rotational force of the motor to a position where the pinch roller and the capstan are to contact the magnetic tape, and that the capstan and the pinch roller transfer the magnetic tape in a direction corresponding to the rotational direction of the motor, with the magnetic tape being held between the capstan and the pinch roller.

According to the auto-reverse type cassette tape driving device described above, the moving means to which the rotational force of the motor has been transmitted not only can contact/separate the magnetic head and the magnetic tape with/from each other, but also can contact/separate the capstan and the pinch roller with/from each other. Consequently, turning the magnetic head by 180°, moving the magnetic head, taking up the magnetic tape and transferring the magnetic tape can be achieved using the single motor.

According to the fourth aspect of the present invention, there is provided a cassette tape driving device comprising:

a head holder including a magnetic head and a rotary shaft and being rotatable on the rotary shaft;

a slider which is slidable and rotates the head holder on the rotary shaft when the slider slides;

a motor which makes a magnetic tape travel in accordance with a rotational direction of the motor;

a pair of reel bases which engage with reels of a cassette containing the magnetic tape;

a train of gears which transmit the rotation of the motor to, of the pair of reel bases, one reel base corresponding to the rotational direction, thereby rotating one of the reels in order to take up the magnetic tape; and a slider driver which slides the slider in a direction according to the rotational direction, with a rotational force transmitted by the train of gears;

wherein turning the magnetic head and driving the reels of the cassette are performed using a motive power generated by the motor.

It is preferred that the head holder further include a first gear coaxial with the rotational shaft; and the slider include a slide member and a second gear which transforms a slide of the slide member into a rotation and which transmits the transformed rotation to the first gear of the head holder in order to rotate the first gear.

It is preferred that the slider include a slide member which is slidable, and the slider driver includes an engaging member which is provided on one of gears forming the train of gears and which engages with the slide member; and the engaging member slide the slider by pressing the slide member in accordance with a rotation of the aforementioned one of the gears.

According to this cassette tape driving apparatus, in the case of transferring the magnetic tape in the first direction, for example, the motor is rotated in the first direction, and the rotation of the motor is transmitted to the train of gears. The train of gears to which the rotation of the motor has been transmitted rotate one reel base engaged with one reel of the cassette, and the magnetic tape is transferred in the magnetic tape in the first direction. At that time, the magnetic head provided on the head holder has already been directed in a predetermined direction.

When the motor is reversed under that condition, the rotation of the motor is transmitted to the train of gears. The train of gears receives the rotation of the motor and transmits the rotation to the engaging member provided on one of the gears forming the train of gears. The engaging member receives the rotation of the motor and rotates together with the aforementioned one of the gears forming the train of gears. While rotating, the engaging member engages with the slide member and presses the slide member in the rotational direction of the engaging member. Due to the pressure applied by the engaging member, the slide member slides in the direction in which the pressure is applied. As the slide member slides, the second gear rotates and transmits the rotation to the first gear. The first gear receives the rotation and transmits the rotation to the head holder via the rotary shaft. When the head holder rotates in accordance with the rotation of the first gear, the magnetic head provided on the head holder rotates together with the head holder, and is directed in the opposite direction to that in the case of transferring the magnetic tape in the first direction. Further, the train of gears transmits the rotation of the motor to the other reel base engaged with the other reel of the cassette tape. Thus, the turn of the magnetic head when reversing the transfer direction of the magnetic tape, and the rotation of a reel can be achieved using the single motor.

According to the fifth aspect of the present invention which aims to achieve the above-described objects, there is provided a cassette tape driving device comprising:

a first reel base and a second reel base which respectively rotate two reels of a cassette containing a magnetic tape;

reel base driving means for selectively rotating one of the first and second reel bases in accordance with a rotation of a motor in order to take up the magnetic tape;

head moving means for separating a magnetic head from the magnetic tape once and bringing the magnetic head into contact with the magnetic tape again when a change in a rotational direction of the motor is designated; and head turning means for turning the magnetic head at a timing when the head moving means separates the magnetic head from the magnetic tape.

According to the above-described cassette tape driving device, when the motor is rotated in the first direction, the reel base driving means rotates the first reel base. The first reel base transmits the rotation of the motor to one reel to transfer the magnetic tape in the first direction. While the magnetic tape is being transferred in the first direction, the magnetic head is in contact with the magnetic tape, with the magnetic head being directed in a predetermined direction.

When the motor is rotated under that condition in the direction opposite to the first direction, the head moving means separates the magnetic head from the magnetic tape. When the magnetic head and the magnetic tape are separated from each other, the head turning means turns the magnetic head. When the magnetic head is turned, the head moving means brings the magnetic head and the magnetic tape into contact with each other again. Then, the reel base driving means rotates the other reel base to take up the magnetic tape in the direction opposite to the first direction.

Thus, turning the magnetic head, moving the magnetic head and taking up the magnetic tape can be realized using the single motor. Since the head moving means separates the magnetic head from the magnetic tape, it is prevented that the magnetic head is turned while the magnetic tape and the magnetic head being in contact with each other.

According to the sixth aspect of the present invention which aims to achieve the above-described objects, there is provided a cassette tape driving device comprising:

a first reel base including a first reel gear and which rotates one of two reels of a cassette containing a magnetic tape;

a second reel base including a second reel gear and which rotates the other reel of the cassette;

a central gear which rotates in accordance with a rotation of a motor;

a planetary gear which rotates in mesh with the central gear and which revolves along an orbit around the central gear while the planetary gear is rotating in mesh with the central gear, the planetary gear coming into mesh with the first reel gear and transmitting the rotation of the central gear to the first reel gear in order to drive the first reel base, and the planetary gear coming into mesh with the second reel gear and transmitting the rotation of the central gear to the second reel gear in order to drive the second reel base;

a mode changing gear arranged in the vicinity of the orbit of the planetary gear, the mode changing gear coming into mesh with the planetary gear while the planetary gear is moving from one of the first and second reel gears to the other of the first and second reel gears in accordance with a rotational direction of the central gear, and being rotated by the planetary gear;

a slidable head base holding a magnetic head and being movable between a first position in which the magnetic head is separate from the magnetic tape and a second position in which the magnetic head is in contact with the magnetic tape;

moving means for moving the head base in accordance with an amount of rotation of the mode changing gear, the moving means moving the head base to the second position while the planetary gear is in mesh with one of the first and second reel gears, and returning the head base from the second position to the first position and further moving the head base to the second position while the planetary gear is moving in the orbit from one of the first and second reel gears to the other of the first and second reel gears; and head turning means for turning the magnetic head in accordance with the rotational direction of the mode changing gear while the moving means is returning the head base to the first position;

wherein the cassette tape driving device is an auto-reverse type, and changes a direction of a transfer of the magnetic tape by using the motor as a single source of a driving force.

It is preferred that:

the mode changing gear be toothed only in a first angular range expanding radially from a center of the mode changing gear, and not be toothed in a remaining second angular range, the mode changing gear rotate in accordance with the rotation of the planetary gear while teeth of the mode changing gear which are formed in the first angular range are engaging with the planetary gear, and the mode changing gear be released from an engagement with the planetary gear and stop rotating when the second angular range faces the planetary gear;

the moving means include means for moving the head base by pressing the head base in accordance with a rotational angle of the mode changing gear; and the head turning means include a slider which slides in accordance with the rotational direction of the mode changing gear and means for turning the magnetic head by 180° in accordance with a slide of the slider and along a direction in which the magnetic tape travels.

According to the above-described cassette tape driving apparatus of the auto-reverse type, the motor rotates in the first direction while the magnetic tape is being transferred in the first direction, for example. The central gear rotates in accordance with the rotation of the motor, and transmits the rotation of the motor to the planetary gear. The planetary gear receives the rotation of the motor and rotates the first reel gear for rotating the first reel base. The first reel base receives the rotation of the first reel gear and rotates one reel so that the magnetic tape is transferred in the first direction. At that time, the head base has already been moved from the first position to the second position, and the magnetic head is in contact with the magnetic tape.

When the motor is rotated under that condition in the direction opposite to the first direction, the central gear receives the rotation of the motor and transmits the rotation to the planetary gear. The planetary gear receives the rotation of the motor and revolves around the central gear in the rotational direction of the central gear while the planetary gear is rotating. During the revolution, the planetary gear meshes with the mode changing gear arranged in the vicinity of the orbit of the planetary gear. The mode changing gear rotates in accordance with the rotation of the planetary gear. The moving means moves the head base from the second position to the first position in accordance with the amount of rotation of the mode changing gear, thus separating the magnetic head and the magnetic tape from each other. When the magnetic head and the magnetic tape are separated from each other, the head turning means turns the magnetic head. When the magnetic head is turned, the moving means moves the head base from the first position to the second position, thus bringing the magnetic head and the magnetic tape into contact with each other. Having disengaged from the mode changing gear, the planetary gear keeps revolving around the central gear, comes into mesh with the second reel gear for rotating the second reel base, and rotates the second reel gear. The second reel gear transmits the rotation of the planetary gear to the second reel base. The second reel base rotates the other reel so that the magnetic tape is transferred in the direction opposite to the first direction.

It is preferred that the cassette tape driving device further comprise revolution stopping means for stopping the planetary gear from revolving around the central gear when the planetary gear meshes with the mode changing gear while the planetary gear is moving in the orbit from one of the first and second reel gears to the other of the first and second reel gears, in order to transmit the rotation of the planetary gear to the mode changing gear, and for permitting the planetary gear to revolve around the central gear when the mode changing gear has rotated through a predetermined angle.

According to the above-described cassette tape driving apparatus of the auto-reverse type, the planetary gear meshes with the mode changing gear while the planetary gear is revolving from one reel gear to the other reel gear, and transmits the rotation of the central gear to the mode changing gear. While the planetary gear is transmitting the rotation of the central gear to the mode changing gear, the revolution stopping means stops the planetary gear from revolving. When the mode changing gear has rotated through a predetermined angle with the rotation of the central gear being transmitted from the planetary gear, the planetary gear becomes revolvable again. In this manner, the planetary gear assuredly transmits the rotation of the central gear to the mode changing gear.

According to the seventh aspect of the present invention which aims to achieve the above-described objects, there is provided a rotation transmitting device comprising:

a first gear which rotates in accordance with a rotation of a motor;

a second gear which rotates in mesh with the first gear and which revolves along an orbit around the first gear while the second gear is rotating in mesh with the first gear;

a third gear arranged in the vicinity of the orbit of the second gear, the third gear meshing with the second gear when the second gear which is revolving around the first gear reaches between the third gear and the first gear, and a rotational force of the first gear being transmitted to the third gear;

a first stopper attached to the second gear and which revolves around the first gear together with the second gear;

a movable member having a second stopper arranged in a position in which the second stopper abuts against the first stopper; and a releasing member attached to the third gear and which releases the first and second stoppers from the state of abutting against each other when the third gear has rotated by a predetermined amount, by moving the movable member in accordance with the rotation of the third gear;

wherein even when the second gear and one of the first and third gears do not satisfactorily engage with each other, the second gear stops revolving around the first gear and transmits the rotation of the first gear to the third gear.

According to the above rotation transmitting device, when the motor is rotated in one direction, the first gear rotates in accordance with the rotation of the motor. Due to the rotation of the first gear, the second gear revolves around the central gear while the second gear is rotating. The second gear comes into mesh with the third gear arranged in the vicinity of the orbit of the second gear, and the rotation of the second gear is transmitted to the third gear. When the second gear and the third gear mesh with each other, the first stopper which revolves together with the second gear, and the second stopper abut against each other and stop the second gear from revolving. When the third gear has rotated through a predetermined angle in accordance with the rotation of the second gear, the releasing member attached to the third gear moves the movable member. When the movable member moves, the second stopper arranged on the movable member moves together with the movable member, and the first and second stoppers are released from the state of abutting against each other. When the first and second stoppers are released from the abutting state, the second gear becomes revolvable, and starts revolving around the first gear again.

Thus, due to the first and second stoppers abutting against each other, the second gear stops revolving, and the rotation of the second gear is assuredly transmitted to the third gear.

DETAILED DESCRIPTION OF THE PREFERRED EMBODIMENT

An auto-reverse type cassette tape player according to an embodiment of the present invention will now be described in detail, with reference to drawings.

Figure 1:
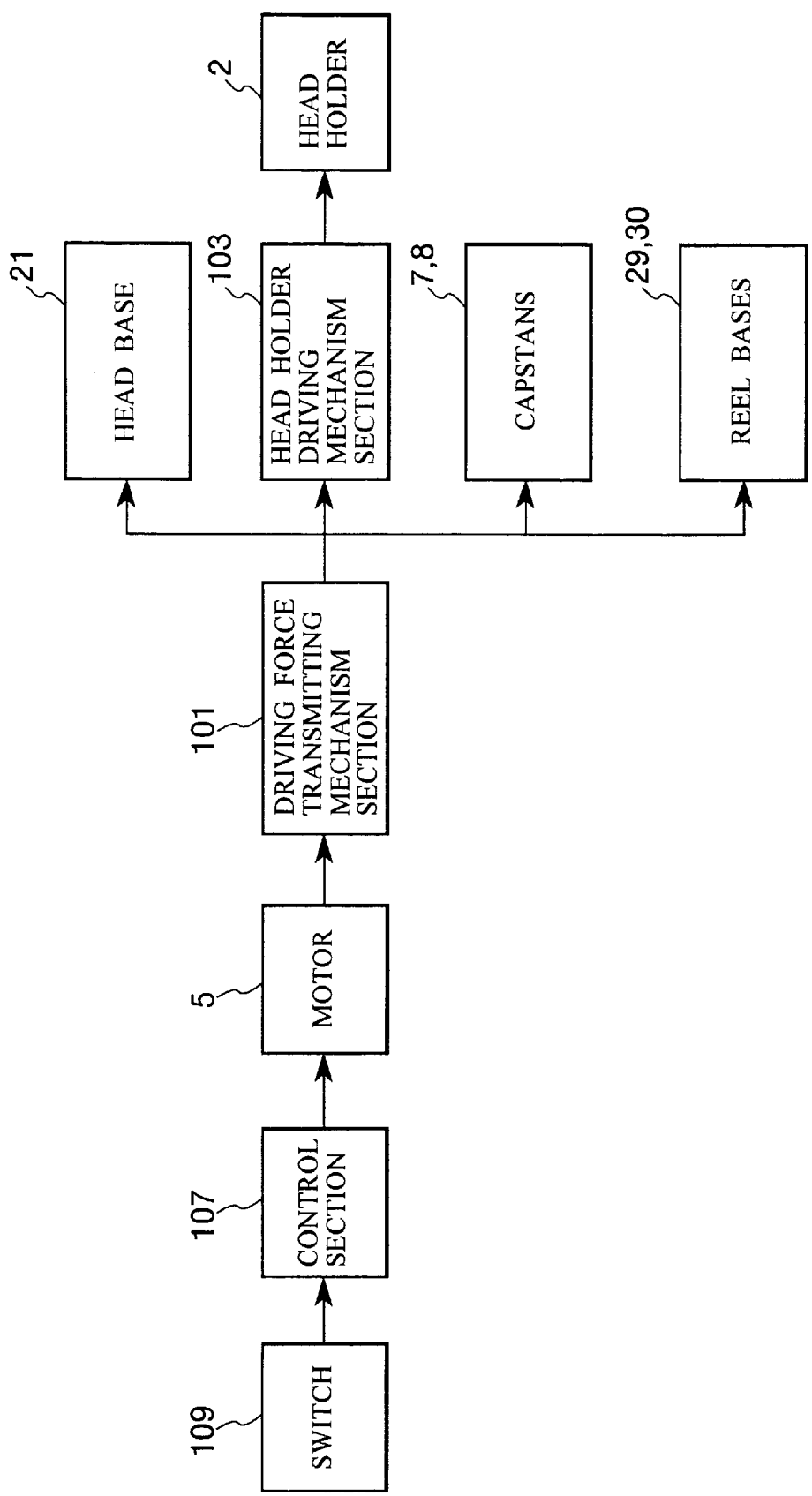
FIG. 1 is a diagram showing the functional structure of a cassette tape driving device according an embodiment of the present invention.

The cassette tape driving device of this embodiment includes a motor 5, a driving force transmitting mechanism section 101, a head base 21, a head holder driving mechanism section 103, capstans 7 and 8, reel bases 29 and 30, a head holder 2, a control section 107 and an operation switch 109, as illustrated in FIG. 1. A feature of the above cassette tape driving device resides in that the head base 21, the capstans 7 and 8, the reel bases 29 and 30, and the head holder 2 are all driven by the motor 5.

The operation switch 109 designates the operation mode of the cassette tape driving device. In accordance with the designated operation mode, the control section 107 supplies a drive signal for rotating the motor 5 in a predetermined direction.

The motor 5 is the one and only source of a driving force in the cassette tape driving device. The head base 21 has a magnetic head 1 and pinch rollers 27 and 28. In accordance with the rotation of the motor 5, the head base 21 brings the magnetic head 1 and the pinch rollers 27 and 28 into contact with, or separates the magnetic head and the pinch rollers from, the magnetic tape of a cassette. The head holder 2 holds the magnetic head 1. The capstans 7 and 8 hold the magnetic tape in cooperation with the pinch rollers 27 and 28, and transfer the magnetic tape in accordance with the rotation of the motor 5. The reel bases 29 and 30 engage with the reels of the cassette and rotate them in accordance with the rotation of the motor 5, in order to have the magnetic tape travel.

The driving force transmitting mechanism section 101 transmits the rotation of the motor 5 to the head base 21, the head holder driving mechanism section 103, the capstans 7 and 8 and the reel bases 29 and 30. The head holder driving mechanism section 103 turns the magnetic head 1 by 180° in accordance with the traveling direction of the magnetic tape and utilizing the rotation of the motor 5 which is transmitted from the driving force transmitting mechanism section 101. According to the above-described structure, the auto-reverse type cassette tape driving device can perform the basic operation with the single motor.

Figure 2:
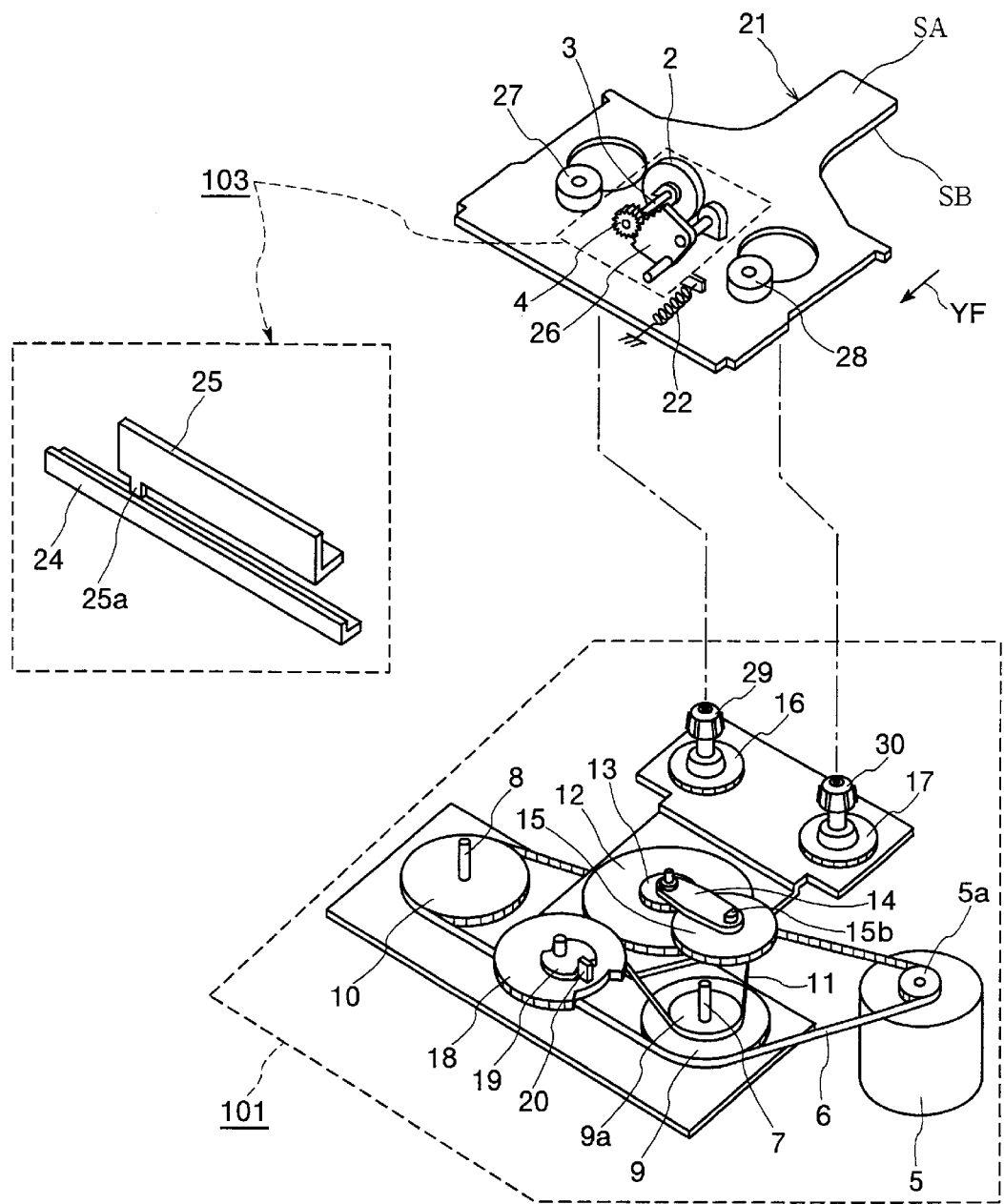
FIG. 2 is a diagram showing an exploded perspective view of the cassette tape driving device according to the embodiment of the present invention.
Figure 3:
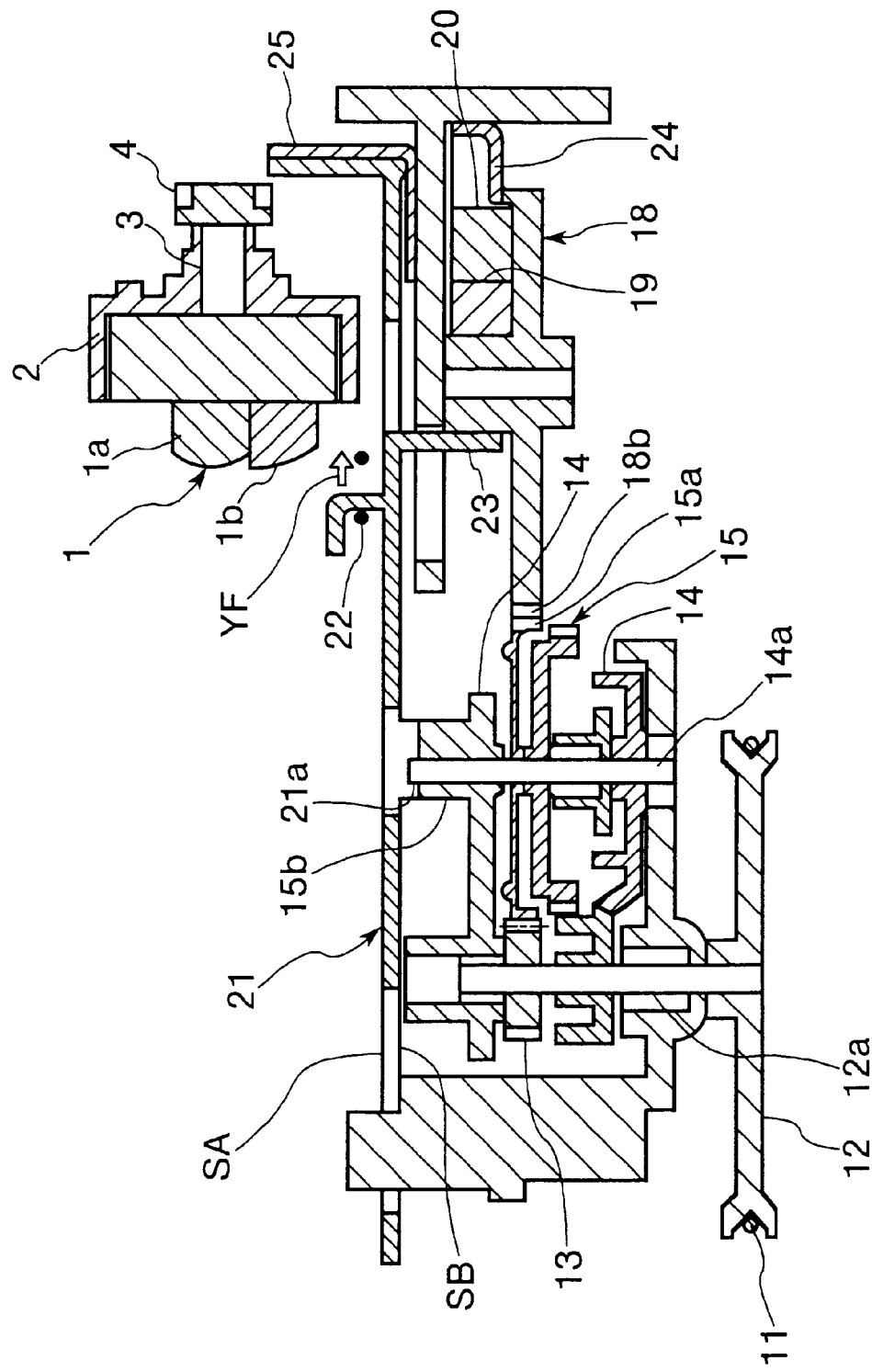
FIG. 3 is a diagram showing a sectional view of the central portion of the cassette tape driving device according to the embodiment of the present invention.

The motor 5, the capstans 7 and 8, the reel bases 29 and 30, the head holder driving mechanism section 103 and the driving force transmitting mechanism section 101 which transmits the rotation of the motor to the head base 21, are all shown in FIG. 1 and have the structures illustrated in FIG. 2 as an exploded perspective view and in FIG. 3 as a sectional view.

The head base 21 is designed so as to be slidable along a positioning pin (not shown) in predetermined two directions. By sliding the head base 21 in one predetermined direction, the magnetic head 1 (described later) is brought into contact with the magnetic surface of a cassette tape. By sliding the head base 21 in the other predetermined direction, the magnetic head 1 is separated from the magnetic surface of the cassette tape.

The head holder 2 and the pinch rollers 27 and 28 are provided on one side "SA" of the head base 21 as illustrated in FIG. 2, while an abutting piece 23 and a bent piece 21a are formed on the other side "SB" of the head base 21 as illustrated in FIG. 3. A spring 22, attached to the side SA of the head base 21, urges the head base 21 in the direction of an arrow YF. The head base 21 is provided with the head holder driving mechanism section 103. The details of the head holder driving mechanism section 103 will be described later with reference to FIG. 13. The driving force transmitting mechanism section 101, which has the structure illustrated in FIG. 4, is formed facing the side SB of the head base 21.

Figure 4:
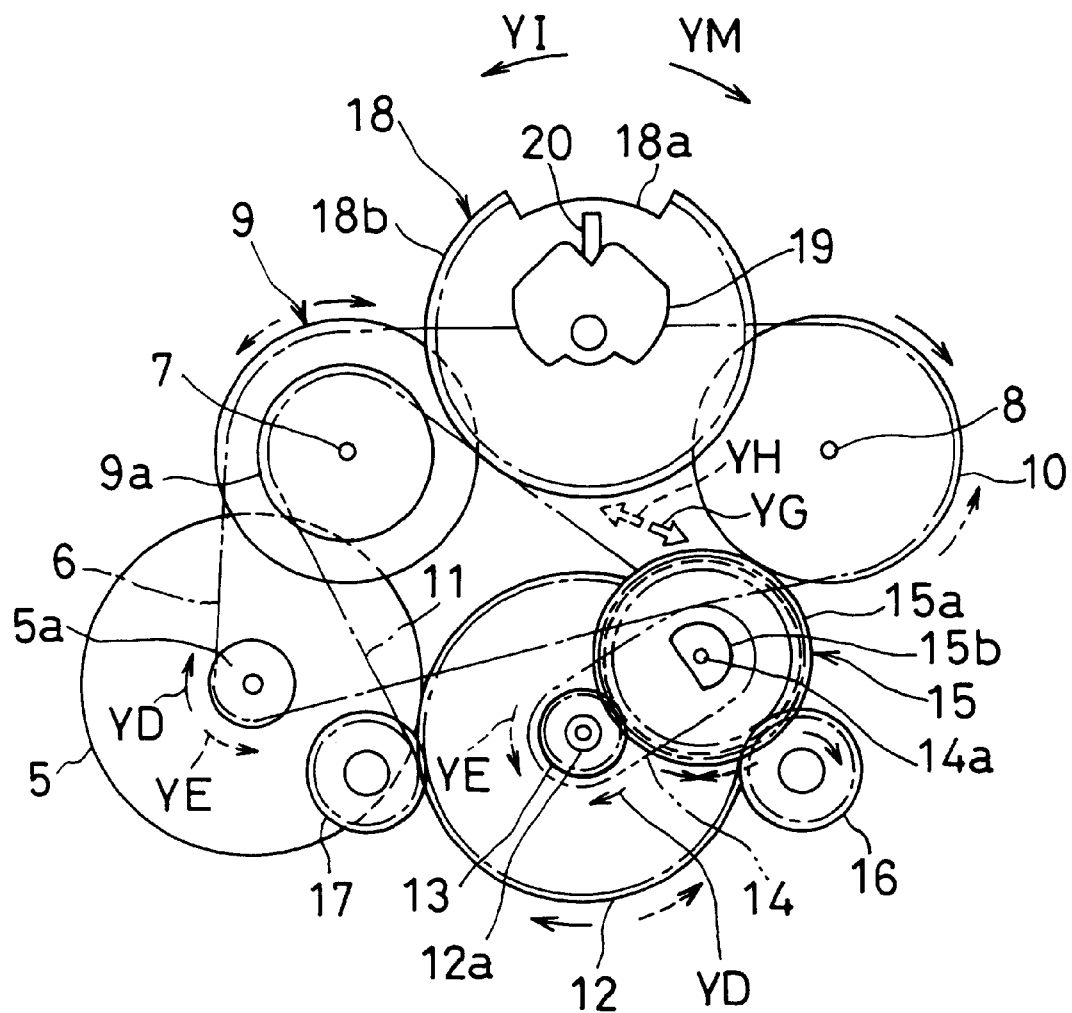
FIG. 4 is a diagram showing a plan view of the driving force transmitting mechanism section of the cassette tape driving device according to the embodiment of the present invention.

In the driving force transmitting mechanism section 101, a motor pulley 5a is mounted on the shaft of the motor 5, and a belt 6 is passed over the motor pulley 5a, as illustrated in FIGS. 2 to 4. The belt 6 is passed also over a forward flywheel pulley 9 and a reverse flywheel pulley 10, and transmits the rotation of the motor 5 in cooperation with those pulleys 9 and 10.

The forward flywheel pulley 9 is provided with a pulley 9a which is coaxial with the pulley 9 and which rotates together with the pulley 9. As the forward flywheel pulley 9 rotates, the pulley 9a rotates and transmits the rotation to a belt 11 which is passed over the pulley 9a. The belt 11 is passed also over an intermediate pulley 12, and transmits the rotation of the pulley 9a to the intermediate pulley 12.

A central gear 13, which is coaxial with the intermediate pulley 12 and which rotates together with the intermediate pulley 12, is mounted on the rotary shaft 12a of the intermediate pulley 12. A rotary arm 14 has two end portions, one end portion being rotatable about the rotary shaft 12a, and the other end portion having a shaft 14a formed thereon. The shaft 14a is provided with a planetary gear 15 which is in mesh with the central gear 13, and a semicircular planetary gear stopper 15b. A spring or the like applies a light rotational load between the shaft 14a and the planetary gear 15. Due to the rotational load, the planetary gear 15 revolves around the central gear 13 in the rotational direction of the central gear 13 as the intermediate pulley 12 and the central gear 13 rotate. The rotary arm 14 and the planetary gear stopper 15b also rotate around the central gear 13, together with the planetary gear 15.

Reel gears 16 and 17 for rotating the real bases 29 and 30 are arranged in the orbit along which the planetary gear 15 revolves. When the central gear 13 rotates in the direction of an arrow YD (FIG. 4), the planetary gear 15 revolves around the central gear 13 in the direction of an arrow YG, together with the rotary arm 14 and the planetary gear stopper 15b, and reaches the position in which the planetary gear 15 meshes with one reel gear 16. When the central gear 13 rotates in the direction of an arrow YE, the planetary gear 15 revolves around the central gear 13 in the direction of an arrow YH, together with the rotary arm 14 and the planetary gear stopper 15b, and reaches the position in which the planetary gear 15 meshes with the other reel gear 17.

Thus, the planetary gear 15 revolves along its orbit within the range defined by the reel gears 16 and 17.

A mode changing gear 18 is arranged in the orbit along which the planetary gear 15 revolves and which extends between the reel gears 16 and 17. The mode changing gear 18 has an untoothed portion 18a, and the remaining circumferential portion has teeth 18b.

When the teeth 18b face the teeth 15a of the planetary gear 15, the teeth 18b engage with the teeth 15a, and the rotation of the planetary gear 15 is transmitted to the mode changing gear 18. When the untoothed portion 18a faces the teeth 15a, the planetary gear 15 passes the untoothed portion 18a, and revolves around the central gear 13 without rotating the mode changing gear 18.

A switching cam 19, which is coaxial with the mode changing gear 18 and which rotates together with the mode changing gear 18, is arranged on one face of the mode changing gear 18 so as to be located in a position deviating toward the untoothed portion 18a from the rotational axis of the switching cam 19. A projection 20 is formed on that side of the mode changing gear 18 which has the untoothed portion 18a, and abuts on the switching cam 19.

As illustrated in FIG. 3, the position of the switching cam 19 deviates from the rotational axis in a direction away from the abutting piece 23 formed on the head base 21. Consequently, the abutting piece 23 and the switching cam 19 abut against or separate from each other in accordance with the rotation angle of the switching cam 19. When the abutting piece 23 and the switching cam 19 are separate from each other, the head base 21 having the abutting piece 23 does not move. While the switching cam 19 are rotating with abutting against the abutting piece 23, the head base 21 moves in the direction opposite to that of the arrow YF shown in FIGS. 2 and 3, against the urging force of the spring 22, due to the pressure which the switching cam 19 applies to the abutting force 23.

In short, due to the pressure applied by the switching cam 19, the head base 21 moves between a home position (in which the magnetic head 1 and the capstans 7 and 8 are separate from the magnetic tape of the cassette) and an operational position (in which the magnetic head 1 and the capstans 7 and 8 are in contact with the magnetic tape in order to, for example, play back the recorded information).

The bent piece 21a is formed so as to be in the orbit of the planetary gear stopper 15b when the head base 21 is located in the stop position (home position), and so as to leave the orbit when the head base 21 moves to the operational position owing to the switching cam 19. When the head base 21 is located in the stop position, the planetary gear stopper 15b while revolving abuts against the bent piece 21a and stops. However, when the head base 21 moves toward the reel bases 29 and 30 due to the pressure which the switching cam 19 applies to the abutting piece 23, the bent piece 21a leaves the orbit of the planetary gear stopper 15b and separates from the planetary gear stopper 15b.

Figure 11:
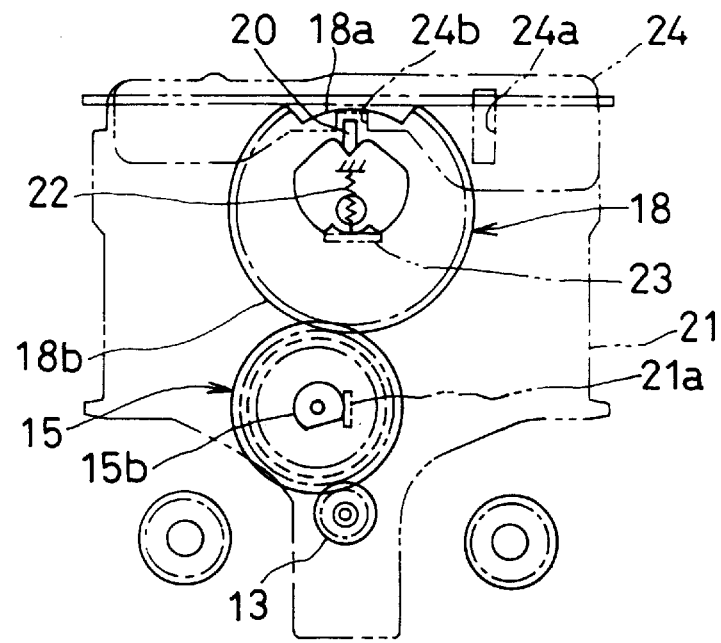
FIG. 11 is a diagram illustrating a plan view which shows the position of the main part of the driving force transmitting mechanism section in the case of a shift from the forward play mode to a stop mode.

The head holder driving mechanism section 103 has such a structure as that shown in FIG. 11.

Figure 5:
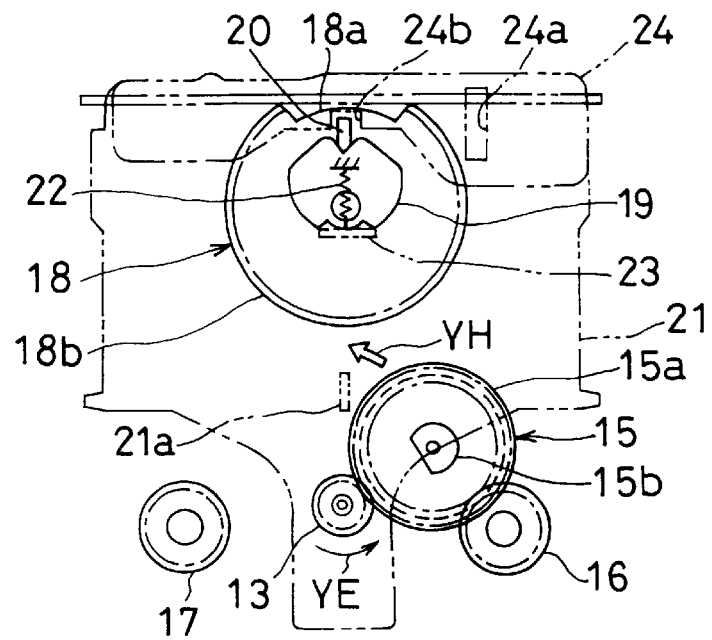
FIG. 5 is a diagram illustrating a plan view which shows the operation of the main part of the driving force transmitting mechanism section in the case of a switch to a forward play mode.

The rotation transmitted from the driving force transmitting mechanism section 101 is transmitted to a pinion 4 by a lower slide lever 24, an upper slide lever 25 and a turning gear 26, and rotates the head holder 2 via a rotary shaft 3. As illustrated in FIG. 3, that end portion of the head base 21 which is in the direction of the arrow YF is provided with the upper slide lever 25. Two projections 25a and 25b are formed on the upper slide lever 25. The lower slide lever 24 is arranged so that the head base 21 is sandwiched between the lower slide lever 24 and the upper slide lever 25. As illustrated in FIG. 5, a recess 24b is formed in the central part of the lower slide lever 24. In a stop mode, the recess 24b faces the projection 20. In a forward mode and a reverse mode, the projection 20 formed on the mode changing gear 18 presses a side wall of the recess 24b, thereby moving the lower slide lever 24 horizontally.

Figure 13:
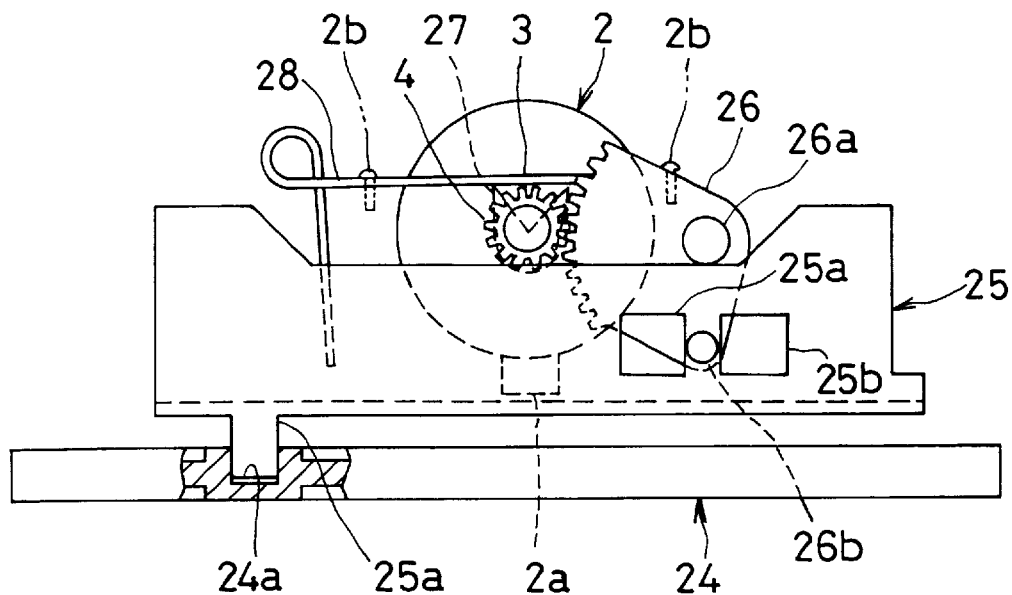
FIG. 13 is a diagram illustrating a plan view which shows the position of a head holder driving mechanism section in a stopped state.

As illustrated in FIG. 13, the lower slide lever 24 and the upper slide lever 25, between which the head base 21 is sandwiched, are connected to each other by the projection 25a being fitted in a groove 24a formed in the lower slide lever 24. Therefore, when the lower slide lever 24 moves, the side lever 25 also moves accordingly.

The turning gear 26 is provided on a rotary shaft 26a, and meshes with the pinion 4. The turning gear 26 is fan-shaped and has a projection 26b formed on one face thereof. The turning gear 26 and the upper slide lever 25 are movably connected to each other with the projection 26b being held between the projections 25a and 25b. Therefore, the turning gear 26 rotates in accordance with the horizontal movement of the upper slide lever 25, and transmits the rotation to the head holder 2.

As illustrated in FIG. 3, the magnetic head 1 is mounted on one face of the head holder 2, while the rotary shaft 3 is provided on the opposite face of the head holder 2. The magnetic head 1 has a playback/recording head portion 1a and an erasure head portion 1b. The pinion 4 is formed on the distal end of the rotary shaft 3. As illustrated in FIG. 13, the pinion 4 is in mesh with the turning gear 26, and rotates the head holder 2 by 180° via the rotary shaft 3 in accordance with the rotation of the turning gear 26. In consequence, the head holder 2 rotates the magnetic head 1 by 180°, and places the magnetic head 1 in a tracking position.

Further, as shown in FIG. 13, a cam 27 is arranged between the head holder 2 and the pinion 4 so as to abut against a turning spring 28. The cam 27 and the turning spring 28 form a mechanism for maintaining the position of the head holder 2. This mechanism prevents the magnetic head 1 from undesirably rotating due to vibration.

A rotation restricting member 2a is formed on a surface of the head holder 2. The main body of the tape player includes two positioning screws 2b.

When the magnetic head 1 has rotated up to a predetermined rotational position, the rotation restricting member 2a abuts against the lower surface of one of the positioning screws 2b, and stops the rotation of the head holder 2. By the rotation restricting member 2b abutting against the two positioning screws 2b alternately, the rotation of the magnetic head 1 is restricted to 180°.

Thus, the head holder driving mechanism section 103 sets the magnetic head 1 in an appropriate position and direction by utilizing the rotation of the motor 5 and in accordance with the direction in which the cassette tape is transferred.

The operation of the cassette tape driving device in each operation mode will now be described.

In the stop mode during which the cassette tape driving device is not operating, the switching cam 19 is separate from the abutting piece 23 formed on the head base 21. Accordingly, the head base 21 is located in the home position with the head base 21 being pulled by the spring 22 in the direction of the arrow YF, as shown in FIG. 3. Under this condition, the magnetic head 1 is separate from the magnetic head 1, and the pinch rollers 27 and 28 are separate from the capstans 7 and 8. Further, as illustrated in FIG. 5, the projection 20 is located in the central part of the recess 24b. Therefore, the projection 20 applies no load to the lower slide lever 24, and the slide levers 24 and 25 do not move. Meanwhile, as illustrated in FIG. 13, the turning spring 28 applies a load to the cam 27 in order to keep the head holder 2.

When the mode is changed, for example, from the state illustrated in FIG. 5 to the forward play mode for recording or playback, the drive control section 107 rotates the motor 5 in the direction of the arrow YE (FIG. 4, etc.) in accordance with the operation of the operation switch 109. Due to the rotation of the motor 5 in the YE direction, the central gear 13 also rotates in the YE direction, as shown in FIG. 5. As the central gear 13 rotates, the planetary gear 15 separates from the reel gear 16, and revolves around the central gear 13 in the direction of the arrow YH.

Figure 6:
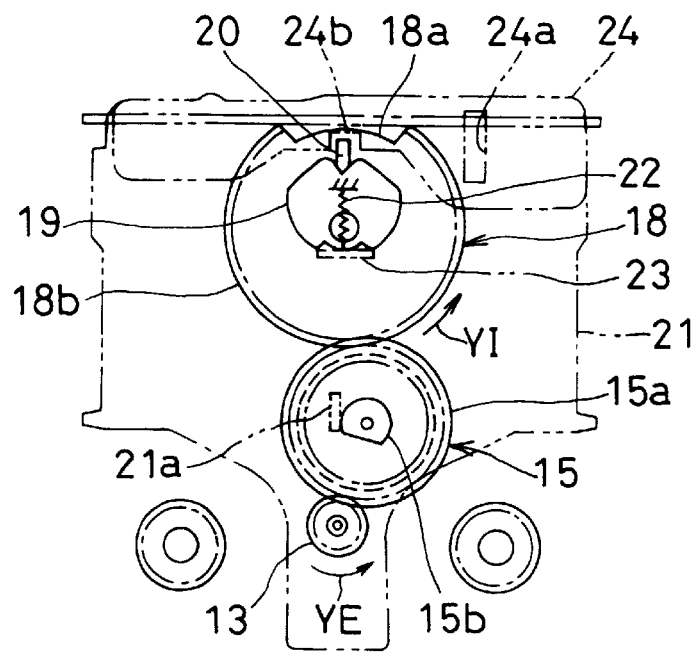
FIG. 6 is a diagram illustrating a plan view which shows the operation of the main part of the driving force transmitting mechanism section in the case of a switch to the forward play mode.

The mode changing gear 18 is located in the orbit of the planetary gear 15. Since the teeth 18b of the mode changing gear 18 face the orbit, the teeth 15a of the revolving planetary gear 15 become engaged with the teeth 18b, as illustrated in FIG. 6. Meanwhile, the planetary gear stopper 15b comes to abut against the bent piece 21a. Because a force which impels the planetary gear 15 to revolve around the central gear 13 acts on the planetary gear 15 due to the rotational load, the planetary gear 15b is fixed in such a position that the planetary gear stopper 15b abuts against the bent piece 21a. Therefore, even if the engagement between the planetary gear 15 and the mode changing gear 18 should be unsatisfactory owing to a clearance therebetween, the rotation of the central gear 13 can be assuredly transmitted to the mode changing gear 18.

Figure 7:
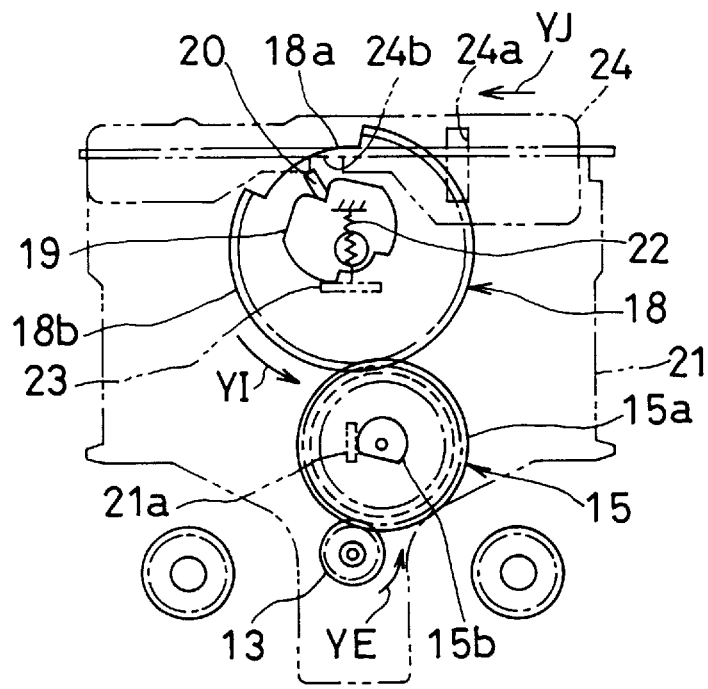
FIG. 7 is a diagram illustrating a plan view which shows the operation of the main part of the driving force transmitting mechanism section in the case of a switch to the forward play mode.
Figure 14:
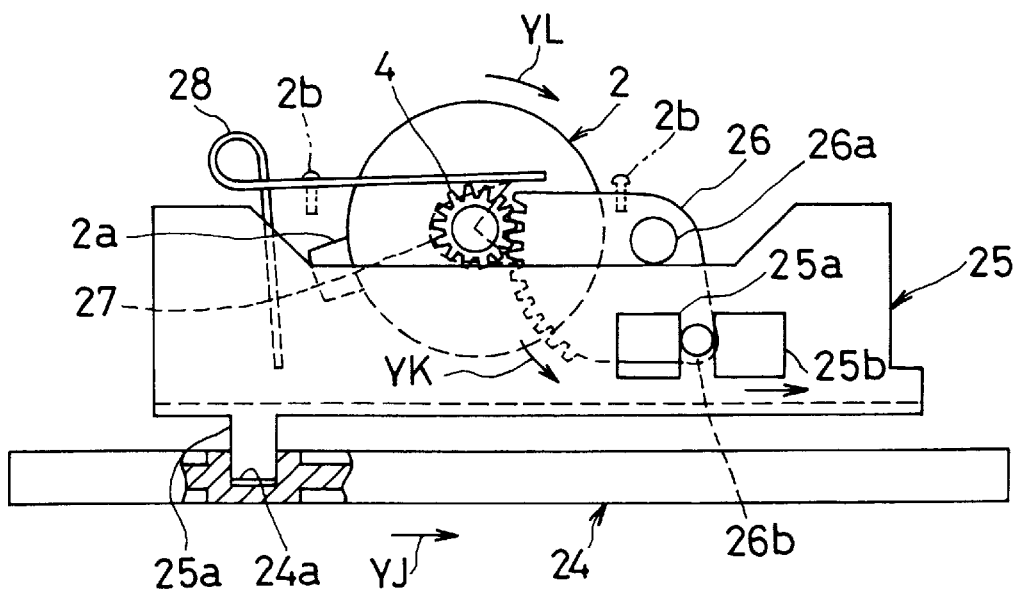
FIG. 14 is a diagram illustrating a plan view which shows the operation of the head holder driving mechanism section during the forward play mode.
Figure 15:
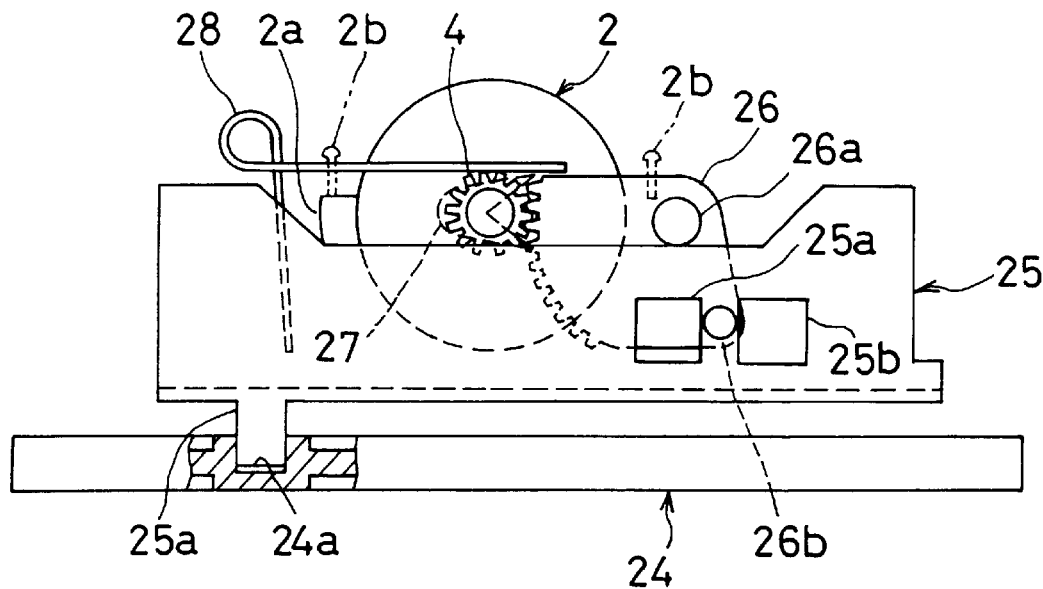
FIG. 15 is a diagram illustrating a plan view which shows the position of the head holder driving mechanism section during the forward play mode.

When the mode changing gear 18 starts rotating in the direction of an arrow YI, the projection 20 abuts against one side wall of the recess 24b formed in the lower slide lever 24, and moves the lower slide lever 24 in the direction of an arrow YJ, as illustrated in FIG. 7. With being interlocked with this movement, the upper slide lever 25 moves horizontally, and rotates the turning gear 26 in the direction of an arrow YK, as shown in FIG. 14. When the turning gear 26 rotates, the pinion 4 which is in mesh with the turning gear 26 rotates the head holder 2 via the rotary shaft 3 in the direction of an arrow YL. Accordingly, the head holder 2 rotates the magnetic head 1 in a predetermined direction for the forward mode. When the head holder 2 has rotated through a predetermined angle, the turning spring 28 applies a load to the cam 27 so that the head holder 2 is kept in a predetermined position, as illustrated in 15. Further, the rotation restricting member 2a abuts against one of the positioning screws 2b, and the head holder 2 stops rotating. Consequently, the magnetic head 1, arranged on the head holder 2, is maintained in a predetermined position and direction (for the forward mode).

After the magnetic head 1 has rotated to the position for the forward mode, the projection 20 comes out from the recess 24b as illustrated in FIG. 7. The lower slide lever 24 released from the load applied by the projection 20 stops, and also the upper slide lever 25 stops. Even after the stoppage of both slide levers 24 and 25, the mode changing gear 18 keeps rotating in the YI direction, and the switching cam 19 fixed to the mode changing gear 18 presses the abutting piece 23.

Due to the pressure applied by the switching cam 19, the head base 21 having the abutting piece 23 moves in the direction opposite to the direction of the arrow YF against the urging force of the spring 22. In accordance with the movement of the head base 21, the magnetic head 1 and the pinch rollers 27 and 28 provided on the head base 21 move in the direction opposite to the direction of the arrow YF (FIGS. 2 and 3).

The bent piece 21a also moves in the direction opposite to the direction of the arrow YF. As a result, a variation occurs in the relative positional relationship between the planetary gear stopper 15b and the bent piece 21a, and due to this variation, the bent piece 21a separates from the orbit along which the planetary gear stopper 15b revolves. The untoothed portion 18a comes to the position opposite to the planetary gear 15, and the planetary gear 15 disengages from the teeth 18b of the mode changing gear 18 and becomes revolvable accordingly.

Figure 8:
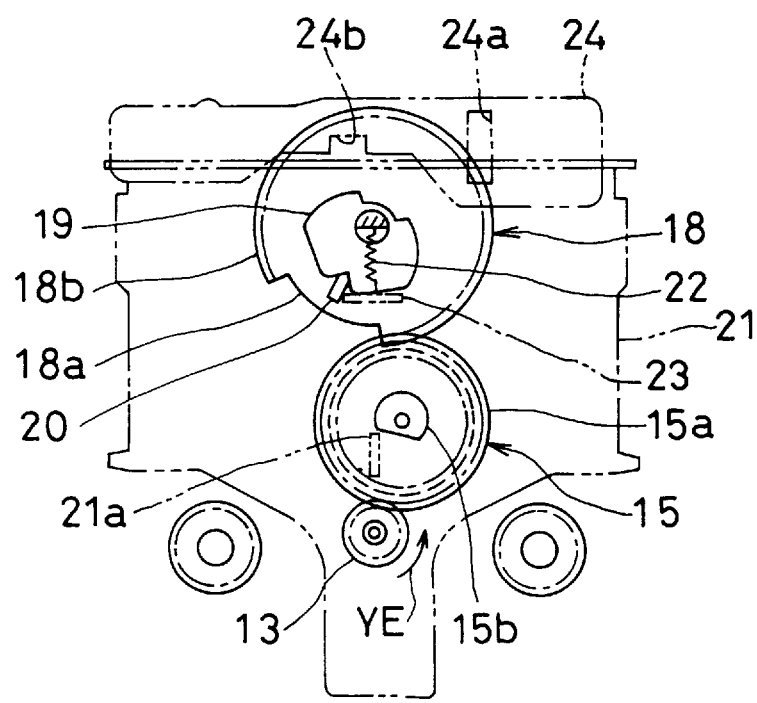
FIG. 8 is a diagram illustrating a plan view which shows the operation of the main part of the driving force transmitting mechanism section in the case of a switch to the forward play mode.

At substantially the same timing as, or slightly after, the timing at which the planetary gear 15 separates from the mode changing gear 18 and becomes removable, the projection 20 formed on the mode changing gear 18 abuts against the abutting piece 23 as illustrated in FIG. 8, and stops the rotation of the mode changing gear 18.

Simultaneously with the stoppage of the rotation of the mode changing gear 18, the movement of the head base 21 halts. The magnetic head 1 of the head base 21 stops in the state of being in contact with the magnetic tape, and the pinch rollers 27 and 28 also stop in the state of being in contact with the capstans 7 and 8 (with the magnetic tape being held between each of the pinch rollers 27, 28 and a corresponding one of the capstans 7, 8). Since the motor 5 is rotating the capstans 7 and 8 via the belt 6, the pinch rollers 27 and 28 and the capstans 7 and 8 transfer the magnetic tape at a constant speed.

Figure 9:
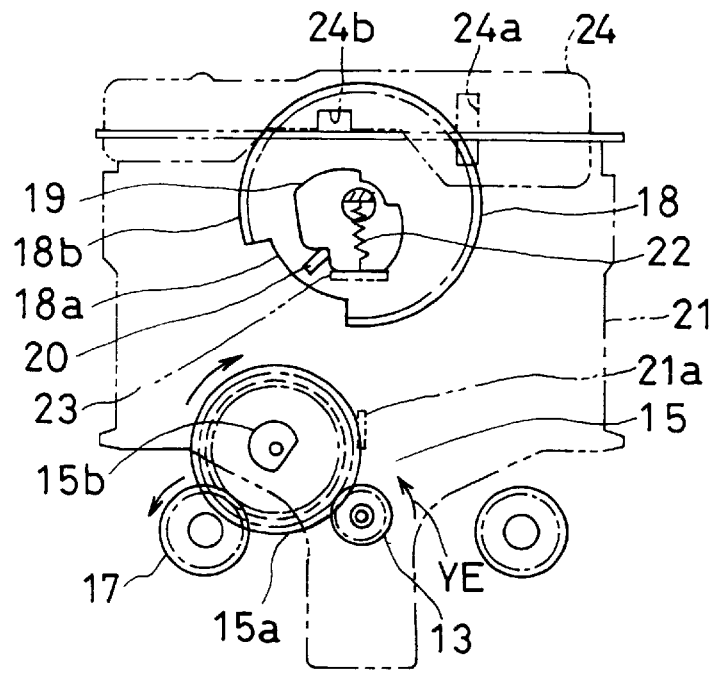
FIG. 9 is a diagram illustrating a plan view which shows the operation of the main part of the driving force transmitting mechanism section during the forward play mode.

The planetary gear 15, which has disengaged from the teeth 18b of the mode changing gear 18, revolves around the central gear 13 in the direction of the arrow YH (FIGS. 4 and 5), and reaches the position in which the planetary gear 17 meshes with the reel gear 17, as shown in FIG. 9. Then the rotation of the planetary gear 15 is transmitted to the reel gear 17, and causes the reel base 30 to rotate such that the magnetic tape is taken up.

Thus, the forward operation of bringing the magnetic head 1 into contact with the magnetic tape, transferring the magnetic tape with the magnetic tape being held between each of the pinch rollers 27, 28 and a corresponding one of the capstans 7, 8, and rotating the reel base 30 so that a reel of the cassette takes up the magnetic tape, can be achieved by rotating the motor 5 in a first direction.

When a reverse operation is designated by the operation of the operation switch 109 or upon the detection of an end of the magnetic tape, the mode changes to the reverse mode, the tape traveling direction of which is opposite to that of the forward mode, and the control section 107 reverses the motor 5 (rotates the motor 5 in the YD direction shown in FIG. 4).

As a result, the central gear 13 rotates in the YD direction and makes the planetary gear 15 rotate. Upon rotating, the planetary gear 15 starts revolving around the central gear 13 in the YG direction and separates from the reel gear 17.

Figure 10:
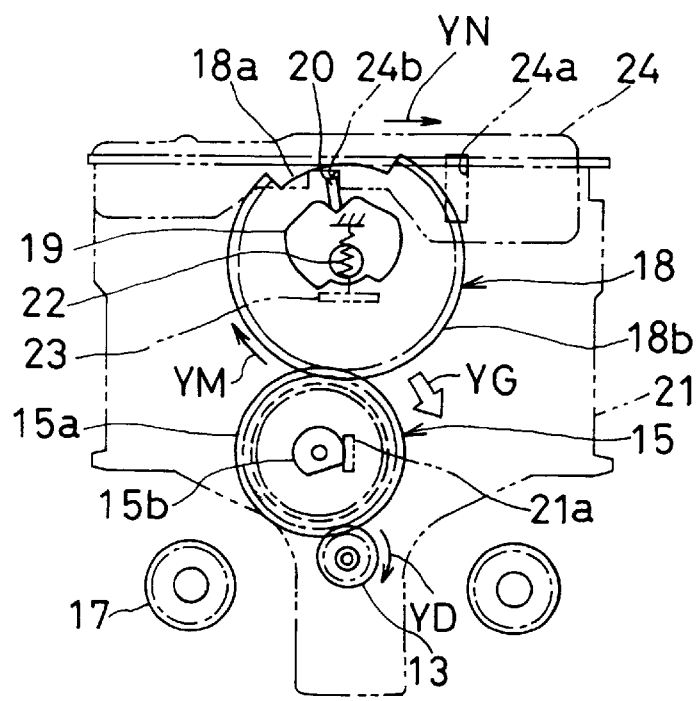
FIG. 10 is a diagram illustrating a plan view which shows the operation of the main part of the driving force transmitting mechanism section in the case of a switch to a reverse play mode.

Then the planetary gear 15 meshes with the mode changing gear 18 arranged in the orbit of the planetary gear 15, as illustrated in FIG. 10. The planetary gear 15 rotates the mode changing gear 18 in the direction of an arrow YM, and rotates the switching cam 19 designed so as to rotate together with the mode changing gear 18. When the switching cam 19 rotates in the YM direction, the abutting piece 23 is released from the pressure applied by the switching cam 19. The head base 21, the abutting piece 23 of which has been released from the pressure, moves in the YF direction and returns to the home position.

As the head base 21 returns to the home position, the magnetic head 1 backs up to such a position that the magnetic head 1 does not contact the magnetic tape, and also the pinch rollers 27 and 28 separate from the capstans 7 and 8. Thus, the mode of the cassette tape driving device shifts to the stop mode. Meanwhile, the bent piece 21a moves into the orbit of the planetary gear stopper 15b, the planetary gear stopper 15b comes to abut against the bent piece 21a located in the orbit. The planetary gear 15 stops at the position in which the planetary gear stopper 15b abuts against the bent piece 21a, and reliably transmits the rotation of the central gear 13 to the mode changing gear 18.

Moreover, as illustrated in FIG. 10, the projection 20 reenters the recess 24b. When the mode changing gear 18 rotates further, the projection 20 comes to abut against that side wall of the recess 24b which is opposite to the side wall against which the projection 20 abuts in the forward mode, and presses the lower slide lever 24.

Figure 16:
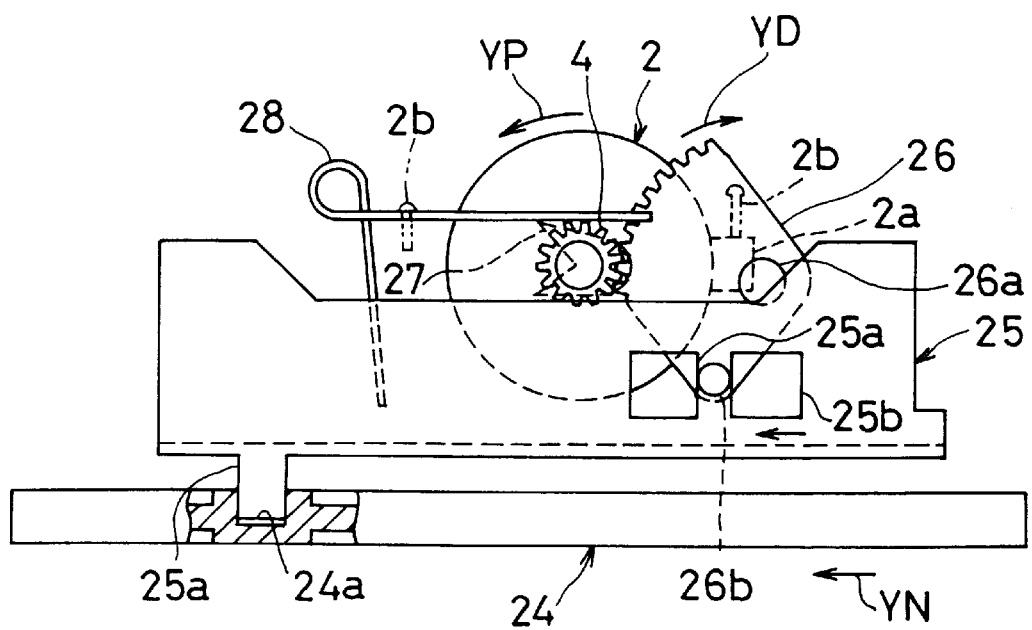
FIG. 16 is a diagram illustrating a plan view which shows the position of the head holder driving mechanism section during the reverse play mode.
Figure 17:
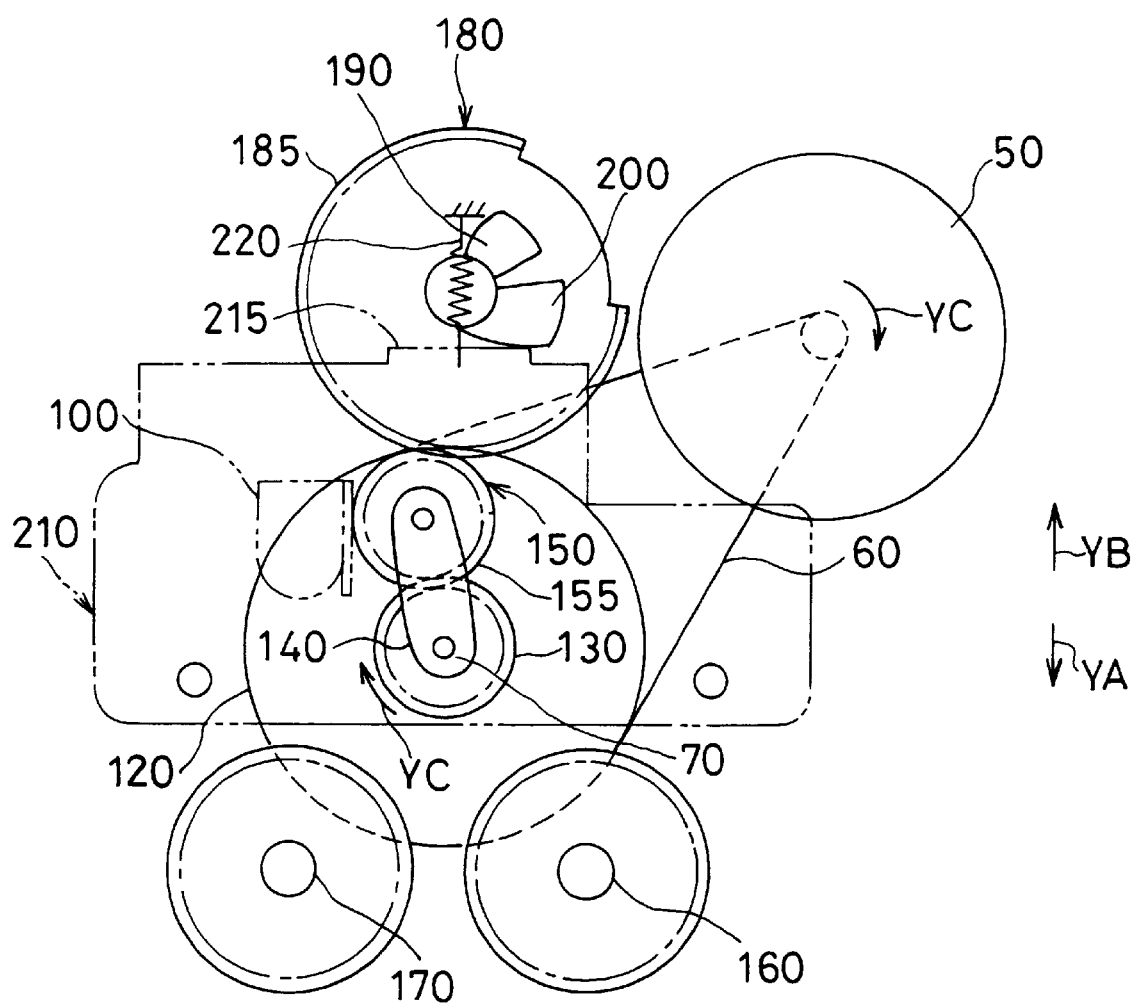
FIG. 17 is a diagram showing a plan view of the driving force transmitting mechanism section of a cassette tape driving device disclosed by Examined Japanese Utility Model Application No. 7-9214.

The lower slide lever 24 pressed by the projection 20 moves horizontally in the direction of an arrow YN. With being interlocked with the lower slide lever 24, the upper slide lever 25 moves horizontally, and rotates the turning gear 26 in the direction of an arrow YO, as illustrated in FIG. 16. The pinion 4, which is in mesh with the turning gear 26, rotates in accordance with the rotation of the turning gear 26, and rotates the head holder 2 in the direction of an arrow YP via the rotary shaft 3.

As the head holder 2 rotates in the YP direction through a predetermined angle, the magnetic head 1 rotates together with the head holder 2 in a predetermined direction for the reverse mode. Then the turning spring 28 applies a load to the cam 27 and holds the head holder 2. Meanwhile, the rotation restricting member 2a comes to abut against one of the positioning screws 2b, and the rotation of the head holder 2 halts. The magnetic head 1 is thus kept in a predetermined position for the reverse mode. The projection 20 comes out from the recess 24b, and both slide levers 24 and 25 stop at their respective positions.

Even after the stoppage of the slide levers 24 and 25, the mode changing gear 18 keeps rotating, and the switching cam 19 fixed to the mode changing gear 18 presses the abutting piece 23.

Due to the pressure applied by the switching cam 19, the head base 21 having the abutting piece 23 moves against the urging force of the spring 22 in the direction opposite to that of the arrow YF. In accordance with the movement of the head base 21, the magnetic head 1 and the pinch rollers 27 and 28 provided on the head base 21 move in the direction opposite to that of the arrow YF (FIGS. 2 and 3).

The bent piece 21a also moves in the direction opposite to that of the arrow YF. As a result, a variation occurs in the relative positional relationship between the planetary gear stopper 15b and the bent piece 21a, and due to this variation, the bent piece 21a separates from the orbit of the planetary gear stopper 15b. The untoothed portion 18a comes to the position opposite to the planetary gear 15, and the planetary gear 15 disengages from the teeth 18b of the mode changing gear 18 and becomes revolvable accordingly.

At substantially the same timing as, or slightly after, the timing at which the planetary gear 15 separates from the mode changing gear 18 and becomes removable, the projection 20 formed on the mode changing gear 18 abuts against the abutting piece 23 and stops the rotation of the mode changing gear 18.

Simultaneously with the stoppage of the rotation of the mode changing gear 18, the movement of the head base 21 halts. The magnetic head 1 of the head base 21 stops in the state of being in contact with the magnetic tape, and the pinch rollers 27 and 28 also stop in the state of being in contact with the capstans 7 and 8 (with the magnetic tape being held between each of the pinch rollers 27, 28 and a corresponding one of the capstans 7, 8). Since the motor 5 is rotating the capstans 7 and 8 via the belt 6, the pinch rollers 27 and 28 and the capstans 7 and 8 transfer the magnetic tape at a constant speed.

The planetary gear 15, which has disengaged from the teeth 18b of the mode changing gear 18, revolves around the central gear 13 in the direction of the arrow YG (FIGS. 4 and 10), and reaches the position in which the planetary gear 17 meshes with the reel gear 17. Then the rotation of the planetary gear 15 is transmitted to the reel gear 16, and causes the reel base 29 to rotate such that the magnetic tape is taken up.

Thus, the reverse operation of bringing the magnetic head 1 into contact with the magnetic tape, transferring magnetic tape with the magnetic tape being held between each of the pinch rollers 27, 28 and a corresponding one of the capstans 7, 8, and rotating the reel base 29 so that a reel of the cassette takes up the magnetic tape, can be achieved by reversing the motor 5.

The operation of the cassette tape driving device in the case of a shift from the forward/reverse mode to the stop mode will now be described.

When the control section 107 receives a stop instruction from the operation switch 109 while the cassette tape driving device is operating in the forward or reverse mode, the control section 107 determines whether the current mode is the forward mode or the reverse mode. In the case of the forward mode, the control section 107 rotates the motor 5 in the YD direction (FIG. 4), and rotates the mode changing gear 18 to the position shown in FIG. 11.

Figure 12:
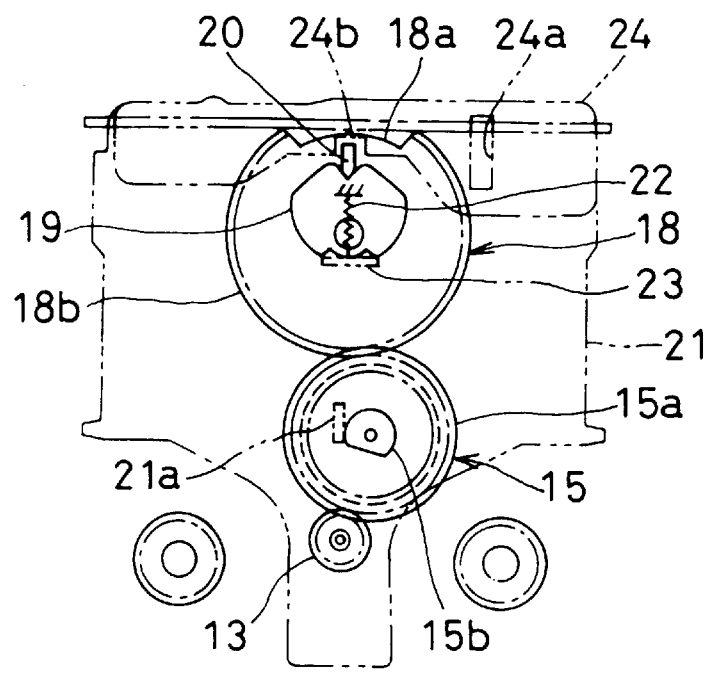
FIG. 12 is a diagram illustrating a plan view which shows the position of the main part of the driving force transmitting mechanism section in the case of a shift from the reverse play mode to the stop mode.

In the case of the reverse mode, the control section 107 rotates the motor 5 in the YE direction (FIG. 4), and rotates the mode changing gear 18 to the position shown in FIG. 12.

As a result, the head base 21 moves in the YF direction due to the urging force of the spring 22, the magnetic head 1 separates from the magnetic tape, and the capstans 7 and 8 also separate from the pinch rollers so that the cassette can be unloaded.

The cassette tape driving device described above has features in that:
  the head holder 2 to which the magnetic head 1 has been attached is rotated by driving the motor 5, and the direction of the magnetic head 1 with respect to the magnetic tape is changed in accordance with a change in the traveling direction of the magnetic tape; and
  the planetary gear stopper 15b which revolves together with the planetary gear 15, and the bent piece 21a formed on the head base 21 are engaged with each other, thereby stopping the revolution of the planetary gear 15 to assuredly transmit the rotation of the central gear to the mode changing gear 18.

However, the cassette tape driving device need not have both of the above-described two features, and may have one of those features.

In the cassette tape driving device of this embodiment, the projection 20 is formed on one face of the mode changing gear 18. However, the present invention is not limited to this structure, and the location, number and shape of the projection 20 are arbitrary insofar as the projection 20 rotates together with the mode changing gear 18, and presses the slide lever 24 in accordance with a change in the traveling direction of the magnetic tape. For example, the projection 20 may be formed on the switching cam 19. A plurality of projections 20 may be formed on both faces of the mode changing gear 18. The shape of the projection 20 is arbitrary, and for example, the projection 20 may be cylindrical or the like.

It is the switching cam 19 which presses the abutting piece 23 in the cassette tape driving device of this embodiment. However, the part which presses the abutting piece 23 is not limited to the switching cam 19. For example, the mode changing gear 18 may be provided with one or more projections which press(es) the abutting piece 23 at a predetermined angle while the mode changing gear 18 is rotating. Further, the head base 21 may be provided with a rack which meshes with the mode changing gear 18, in order to move the head base 21 as the mode changing gear 18 rotates.

Figure 18:
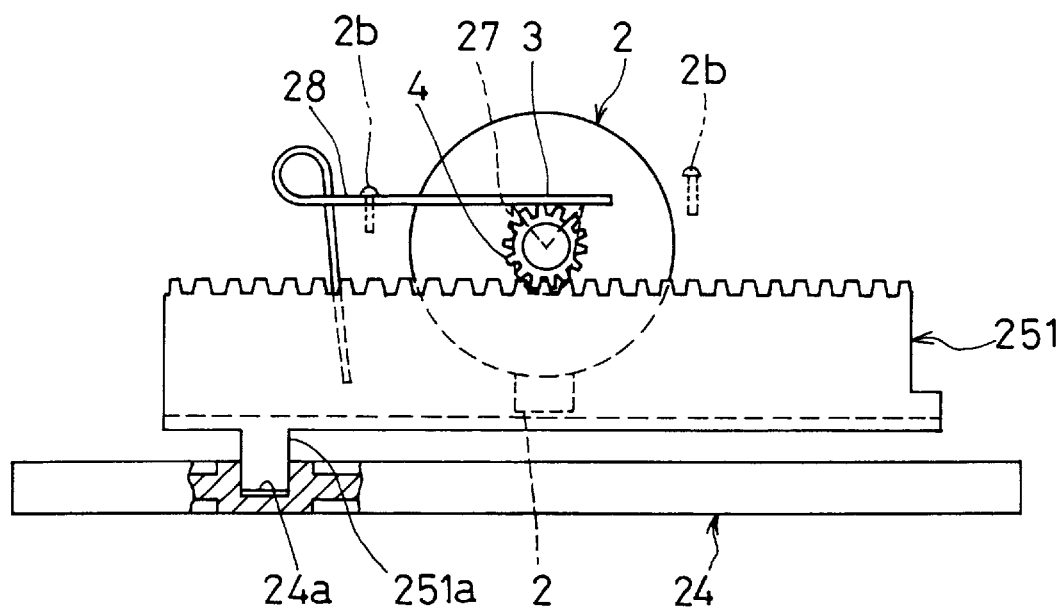
FIG. 18 is a diagram depicting a plan view which exemplifies a modification of a slide lever according to the embodiment of the present invention.

A structure for rotating the pinion 4 by a predetermined angle in accordance with the rotation of the mode changing gear 18 is not limited to that of this embodiment. For example, as illustrated in FIG. 18, a rack 251 which moves horizontally together with the slide lever 24 can be meshed with the pinion 4, and the pinion 4 may be rotated in accordance with the horizontal movement of the slide lever 24.

In the cassette tape driving device of this embodiment, the bent piece 21a is formed by bending a part of the head base 21. However, the shape, material and number of the bent piece 21a are arbitrary insofar as the bent piece 21a can stop the revolution of the planetary gear 15 by way of engaging with the planetary gear stopper 15b. For example, the bent piece 21a may be formed by fixing a member to the head base 21 in the manner of welding the member onto the head base 21.

In the cassette tape driving device of this embodiment, the abutting piece 23 is formed by bending a part of the head base 21. However, the shape, material and number of the abutting piece 23 are arbitrary insofar as the abutting piece 23 is capable of abutting against the switching cam 19 and moving the head base 21. For example, in a position in which the head base 21 abuts against the switching cam 19, a member may be formed by way of welding.

As described above, the cassette tape driving device according to the present invention includes the central gear which rotates in accordance with the rotation of the motor, the planetary gear which revolves around the central gear while the planetary gear is rotating in mesh with the central gear, and the mode changing gear which meshes with the planetary gear. The above-described cassette tape driving device further includes the projection formed on one face of the mode changing gear and which rotates together with the mode changing gear, and the slide lever which moves horizontally due to the load applied by the projection. Therefore, even though the cassette tape driving device is the auto-reverse type, the capstans, the reel bases, the head base and the head holder can be driven by the single motor, which contributes toward the simplification of the structure and a reduction in the manufacturing cost.

Further, the head base is provided with the bent piece which abuts against the planetary gear stopper until the mode changing gear rotates through a predetermined angle. By virtue of the presence of the bent piece, the revolution of the planetary gear is stopped assuredly, and the rotation of the planetary gear is transmitted to the mode changing gear. The projection formed on one face of the mode changing gear serves also as the stopper which stops the mode changing gear. This ensures a simplified structure to the cassette tape driving device.

What is claimed is:

1. A cassette tape driving device comprising:
   a motor;
   a head base including a magnetic head and first and second members, and being movable between a first position in which said magnetic head is separate from a magnetic tape of a cassette and a second position in which said magnetic head is in contact with the magnetic tape;
   a central gear which rotates in accordance with a rotation of said motor;
   a planetary gear which rotates in mesh with said central gear and which revolves along an orbit around said central gear while said planetary gear is rotating in mesh with said central gear;
   a pair of reel gears which are arranged in the vicinity of the orbit of said planetary gear and which rotate a pair of reel bases for rotating reels of said cassette, said planetary gear revolving in a direction in which said central gear rotates and coming into mesh with one of said pair of reel gears, and said planetary gear rotating the reel gear which has meshed with said planetary gear, thereby rotating one of said pair of reel bases in order to have one of said reels take up the magnetic tape;

a third member which is attached to said planetary gear and which revolves around said central gear together with said planetary gear, said third member abutting against said second member while said third member is revolving around said central gear, thereby stopping said planetary gear from revolving;

a mode changing gear arranged in a position in which said mode changing gear meshes with said planetary gear which has stopped revolving upon the abutting of said third member against said second member, said mode changing gear having a toothed portion and an untoothed portion both being formed to allow said mode changing gear to rotate through a predetermined angle in accordance with the rotation of said planetary gear; and a switching member which rotates together with said mode changing gear and which presses said first member, thereby moving said head base to said second position in order to bring said magnetic head into contact with the magnetic tape, and said switching member releasing said second and third members from the state of abutting against each other, thereby permitting said planetary gear to revolve around said central gear.

2. The cassette tape driving device according to claim 1, wherein said head base is urged toward said first position from said second position, and when said first member is released from a pressure which said switching member applies to said first member, said head base returns to said first position toward which said head base is urged, and makes said second member abut against said third member.

3. The cassette tape driving device according to claim 1, wherein said mode changing gear includes a fourth member which rotates together with said mode changing gear and which abuts against said first member to stop the rotation of said mode changing gear when said mode changing gear has rotated through the predetermined angle.

4. The cassette tape driving device according to claim 1, further comprising:

a pinch roller formed on said head base; and a capstan which rotates in accordance with the rotation of the motor and transfers the magnetic tape in cooperation with said pinch roller with the magnetic tape being held between said capstan and said pinch roller when said head base is located in said second position.

5. An auto-reverse type cassette tape driving device comprising:

a head base including a first member and a head holder holding a magnetic head, said head base being movable between a first position in which said magnetic head is separate from a magnetic tape of a cassette and a second position in which said magnetic head is in contact with the magnetic tape;

a central gear which rotates in accordance with a rotation of a motor;

a planetary gear which rotates in mesh with said central gear and which revolves along an orbit around said central gear while said planetary gear is rotating in mesh with said central gear;

a pair of reel gears which are arranged in the vicinity of the orbit of said planetary gear and which rotate a pair of reel bases for rotating reels of said cassette, said planetary gear revolving in a direction in which said central gear rotates and coming into mesh with one of said pair of reel gears, and said planetary gear rotating the reel gear which has meshed with said planetary gear, thereby rotating one of said pair of reel bases in order to have one of said reels take up the magnetic tape;

a mode changing gear arranged in a position in which said mode changing gear meshes with said planetary gear while said planetary gear is revolving along the orbit, said mode changing gear having a toothed portion and an untoothed portion both being formed to allow said mode changing gear to rotate through a predetermined angle in accordance with the rotation of said planetary gear;

a switching member which rotates together with said mode changing gear and which presses said head base, thereby moving said head base to said second position in order to bring said magnetic head into contact with the magnetic tape;

a second member which rotates together with said mode changing gear; and a slide lever which engages with said second member and moves horizontally to turn said head holder by a predetermined angle, while said second member is rotating.

6. The auto-reverse type cassette tape driving device according to claim 5, wherein said head base is urged toward said first position from said second position, and when said first member is released from a pressure which said switching member applies to said first member, said head base returns to said first position to which said head base is urged.

7. The auto-reverse type cassette tape driving device according to claim 5, wherein:

a third member, which revolves around said central gear together with said planetary gear, is attached to said planetary gear; and said head base further includes a fourth member which abuts against said third member when said head base is moved to said first position, and which is released from the state of abutting against said third member when said head base is moved to said second position.

8. The auto-reverse type cassette tape driving device according to claim 5, further comprising:

a pinch roller formed on said head base; and a capstan which rotates in accordance with the rotation of the motor and transfers the magnetic tape in cooperation with said pinch roller with the magnetic tape being held between said capstan and said pinch roller when said head base is located in said second position.

9. A cassette tape driving device comprising:

a motor;

instruction means for issuing an instruction designating a transfer direction of a magnetic tape and an instruction designating a reversal of the transfer direction of the magnetic tape;

motor driving means for rotating said motor in a designated direction in response to the instruction designating the transfer direction from said instruction means, and for reversing said motor in response to the instruction designating the reversal of the transfer direction from said instruction means;

head driving means for turning a magnetic head with a rotational force generated by said motor and in accordance with a rotational direction in which said motor is rotated;

moving means for receiving the rotational force generated by said motor and moving the magnetic head with the rotational force to a position in which the magnetic head is to contact the magnetic tape; and reel rotation means for receiving the rotational force generated by said motor and rotating, with the rotational force, a reel of a cassette containing the magnetic tape in a direction corresponding to the rotational direction of said motor, thereby making the reel take up the magnetic tape;

wherein turning said magnetic head, bringing said magnetic head into contact with the magnetic tape, separating said magnetic head from the magnetic tape and driving the reel are performed using a driving force generated by said motor.

10. The cassette tape driving device according to claim 9, wherein:

said moving means includes means for separating said magnetic head from the magnetic tape once and bringing said magnetic head into contact with the magnetic tape again, in response to the instruction designating the reversal of the transfer direction from said instruction means; and said head driving means turns said magnetic head in accordance with a new transfer direction of the magnetic tape while said magnetic head is separate from the magnetic tape.

11. The cassette tape driving device according to claim 10, wherein:

said moving means further includes a pinch roller and a capstan both rotating in accordance with the rotational force of said motor and both being provided for transferring the magnetic tape, at least one of said pinch roller and said capstan is moved with the rotational force of said motor to a position where said pinch roller and said capstan are to contact the magnetic tape, and said capstan and said pinch roller transfer the magnetic tape in a direction corresponding to the rotational direction of said motor, with the magnetic tape being held between said capstan and said pinch roller.

12. A cassette tape driving device comprising:

a head holder including a magnetic head and a rotary shaft and being rotatable on said rotary shaft;

a slider which is slidable and rotates said head holder on said rotary shaft when said slider slides;

a motor which makes a magnetic tape travel in accordance with a rotational direction of said motor;

a pair of reel bases which engage with reels of a cassette containing the magnetic tape;

a train of gears which transmit the rotation of said motor to one of said pair of reel bases, one reel base corresponding to the rotational direction, thereby rotating one of said reels in order to take up the magnetic tape; and a slider driver which slides said slider in a direction according to the rotational direction, with a rotational force transmitted by said train of gears;

wherein turning said magnetic head and driving the reels of the cassette are performed using a motive power generated by said motor.

13. A cassette tape driving device comprising:

a head holder including a magnetic head and a rotary shaft and being rotatable on said rotary shaft;

a slider which is slidable and rotates said head holder on said rotary shaft when said slider slides;

a motor which makes a magnetic tape travel in accordance with a rotational direction of said motor;

a pair of reel bases which engage with reels of a cassette containing the magnetic tape;

a train of gears which transmit the rotation of said motor to one of said pair of reel bases, one reel base corresponding to the rotational direction, thereby rotating one of said reels in order to take up the magnetic tape; and a slider driver which slides said slider in a direction according to the rotational direction, with a rotational force transmitted by said train of gears;

wherein turning said magnetic head and driving the reels of the cassette are performed using a motive power generated by said motor;

wherein said head holder further includes a first gear coaxial with said rotational shaft; and wherein said slider includes a slide member and a second gear which transforms a slide of said slide member into a rotation and which transmits the transformed rotation to said first gear of said head holder in order to rotate said first gear.

14. A cassette tape driving device comprising:

a head holder including a magnetic head and a rotary shaft and being rotatable on said rotary shaft;

a slider which is slidable and rotates said head holder on said rotary shaft when said slider slides;

a motor which makes a magnetic tape travel in accordance with a rotational direction of said motor;

a pair of reel bases which engage with reels of a cassette containing the magnetic tape;

a train of gears which transmit the rotation of said motor to one of said pair of reel bases, one reel base corresponding to the rotational direction, thereby rotating one of said reels in order to take up the magnetic tape; and a slider driver which slides said slider in a direction according to the rotational direction, with a rotational force transmitted by said train of gears;

wherein turning said magnetic head and driving the reels of the cassette are performed using a motive power generated by said motor;

wherein said slider includes a slide member which is slidable, and said slider driver includes an engaging member which is provided on one of gears forming said train of gears and which engages with said slide member; and wherein said engaging member slides said slider by pressing said slide member in accordance with a rotation of said one of said gears.

15. A cassette tape driving device comprising:

a first reel base and a second reel base which respectively rotate two reels of a cassette containing a magnetic tape;

reel base driving means for selectively rotating one of said first and second reel bases in accordance with a rotation of a motor in order to take up the magnetic tape;

head moving means for separating a magnetic head from the magnetic tape once and bringing the magnetic head into contact with the magnetic tape again when a change in a rotational direction of the motor is designated; and head turning means for turning the magnetic head at a timing when said head moving means separates the magnetic head from the magnetic tape.

16. A cassette tape driving device comprising:

a first reel base including a first reel gear and which rotates one of two reels of a cassette containing a magnetic tape;

a second reel base including a second reel gear and which rotates the other reel of the cassette;

a central gear which rotates in accordance with a rotation of a motor;

a planetary gear which rotates in mesh with said central gear and which revolves along an orbit around said central gear while said planetary gear is rotating in mesh with said central gear, said planetary gear coming into mesh with said first reel gear and transmitting the rotation of said central gear to said first reel gear in order to drive said first reel base, and said planetary gear coming into mesh with said second reel gear and transmitting the rotation of said central gear to said second reel gear in order to drive said second reel base;

a mode changing gear arranged in the vicinity of the orbit of said planetary gear, said mode changing gear coming into mesh with said planetary gear while said planetary gear is moving from one of said first and second reel gears to the other of said first and second reel gears in accordance with a rotational direction of said central gear, and being rotated by said planetary gear;

a slidable head base holding a magnetic head and being movable between a first position in which the magnetic head is separate from the magnetic tape and a second position in which the magnetic head is in contact with the magnetic tape;

moving means for moving said head base in accordance with an amount of rotation of said mode changing gear, said moving means moving said head base to said second position while said planetary gear is in mesh with one of said first and second reel gears, and returning said head base from said second position to said first position and further moving said head base to said second position while said planetary gear is moving in the orbit from one of said first and second reel gears to the other of said first and second reel gears; and head turning means for turning the magnetic head in accordance with the rotational direction of said mode changing gear while said moving means is returning said head base to said first position;

wherein said cassette tape driving device is an auto-reverse type, and changes a direction of a transfer of the magnetic tape by using the motor as a single source of a driving force.

17. The cassette tape driving device according to claim 16, wherein:

said mode changing gear is toothed only in a first angular range expanding radially from a center of said mode changing gear, and is not toothed in a remaining second angular range, said mode changing gear rotates in accordance with the rotation of said planetary gear while teeth of said mode changing gear which are formed in said first angular range are engaging with said planetary gear, and said mode changing gear is released from an engagement with said planetary gear and stops rotating when said second angular range faces said planetary gear;

said moving means includes means for moving said head base by pressing said head base in accordance with a rotational angle of said mode changing gear; and said head turning means includes a slider which slides in accordance with the rotational direction of said mode changing gear and means for turning the magnetic head by 180° in accordance with a slide of said slider and along a direction in which the magnetic tape travels.

18. The cassette tape driving device according to claim 16, further comprising:

revolution stopping means for stopping said planetary gear from revolving around said central gear when said planetary gear meshes with said mode changing gear while said planetary gear is moving in the orbit from one of said first and second reel gears to the other of said first and second reel gears, in order to transmit the rotation of said planetary gear to said mode changing gear, and for permitting said planetary gear to revolve around said central gear when said mode changing gear has rotated through a predetermined angle.

19. A rotation transmitting device comprising:

a first gear which rotates in accordance with a rotation of a motor;

a second gear which rotates in mesh with said first gear and which revolves along an orbit around said first gear while said second gear is rotating in mesh with said first gear;

a third gear arranged in the vicinity of the orbit of said second gear, said third gear meshing with said second gear when said second gear which is revolving around said first gear reaches between said third gear and said first gear, and a rotational force of said first gear being transmitted to said third gear;

a first stopper attached to said second gear and which revolves around said first gear together with said second gear;

a movable member having a second stopper arranged in a position in which said second stopper abuts against said first stopper when said second gear reaches a predetermined position at which the second gear can transmit rotation of said first gear to said third gear, the second stopper stopping revolution of said second gear by abutting the first stopper; and a releasing member attached to said third gear and which releases said first and second stoppers from the state of abutting against each other when said third gear has rotated by a predetermined amount, by moving said movable member in accordance with the rotation of said third gear;

wherein even when said second gear and one of said first and third gears do not satisfactorily engage with each other, said second gear stops revolving around said first gear by abutting the first and second stopper with each other, and transmits the rotation of said first gear to said third gear.

* * * * *